US008442678B2

(12) United States Patent
Ichikawa et al.

(10) Patent No.: US 8,442,678 B2
(45) Date of Patent: May 14, 2013

(54) ROBOTIC DEVICE

(75) Inventors: Kentaro Ichikawa, Numazu (JP); Shigeki Sugano, Tokyo (JP); Kunihiro Iwamoto, Tokyo (JP); Taisuke Sugaiwa, Tokyo (JP); Hiroyasu Iwata, Tokyo (JP)

(73) Assignees: Toyota Jidosha Kabushiki Kaisha, Toyota-shi (JP); Waseda University, Shinjuku-Ku, Tokyo (JP)

( * ) Notice: Subject to any disclaimer, the term of this patent is extended or adjusted under 35 U.S.C. 154(b) by 708 days.

(21) Appl. No.: 12/631,100

(22) Filed: Dec. 4, 2009

(65) Prior Publication Data

US 2010/0139437 A1  Jun. 10, 2010

(30) Foreign Application Priority Data

Dec. 4, 2008  (JP) ................. 2008-309798

(51) Int. Cl.
*B25J 13/02* (2006.01)
(52) U.S. Cl.
USPC ............. 700/245; 74/490.05; 901/9; 901/10; 901/33; 901/34
(58) Field of Classification Search ............. 414/5, 729, 414/730, 739; 901/9, 10, 33, 34; 294/106, 294/907; 74/490.05; 700/245, 257
See application file for complete search history.

(56) References Cited

U.S. PATENT DOCUMENTS 8,195,334 B2 * 6/2012 Fukushima et al. .......... 700/260
8,231,158 B2 * 7/2012 Dollar et al. ................. 294/106
2004/0103740 A1 * 6/2004 Townsend et al. .......... 74/490.01
2006/0115348 A1 * 6/2006 Kramer ............................ 414/5
2006/0158146 A1 * 7/2006 Tadano .................... 318/568.21

FOREIGN PATENT DOCUMENTS

| JP | 03184786 A | 8/1991 |
|---|---|---|
| JP | 2003245883 A | 9/2003 |

OTHER PUBLICATIONS

WO2007069424(a) Cover sheet of WIPO publication 2007/069424 (see wipo website).*
WO2007069424(b) Specification sheets of WIPO publication 2007/069424 (see wipo website).*
Sasaki, Daisuke; Noritsugu, Toshiro; and Takaiwa, Masahiro, "Development of Pressure Measurement Type Tactile Soft Sensor for Live Assist Robot," Japan Society of Mechanical Engineers, Transactions of the Japan Society of Mechanical Engineers, C 70 (689) pp. 77-82, Jan. 2004.

* cited by examiner

*Primary Examiner* — Scott Lowe
(74) *Attorney, Agent, or Firm* — Gifford, Krass, Sprinkle, Anderson & Citkowski, P.C.

(57) ABSTRACT

A robotic device includes a first link portion, a second link portion that moves relative to the first link portion, a first contact load detecting portion that detects a contact load in a contact area of the first link portion, a second contact load detecting portion that detects a contact load in a contact area of the second link portion, and a first link portion control target setting portion that sets a control target for the first link portion. The first link portion control target setting portion sets the control target for the first link portion such that the difference between the detection value of the contact load of the first contact load detecting portion and the detection value of the contact load of the second contact load detecting portion decreases.

15 Claims, 33 Drawing Sheets

F I G . 12
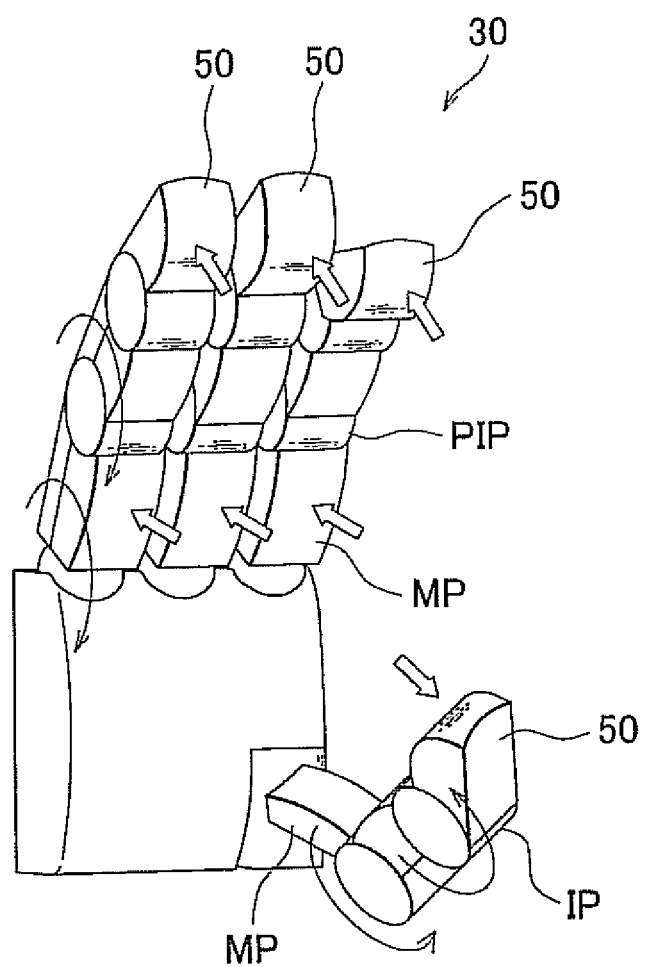

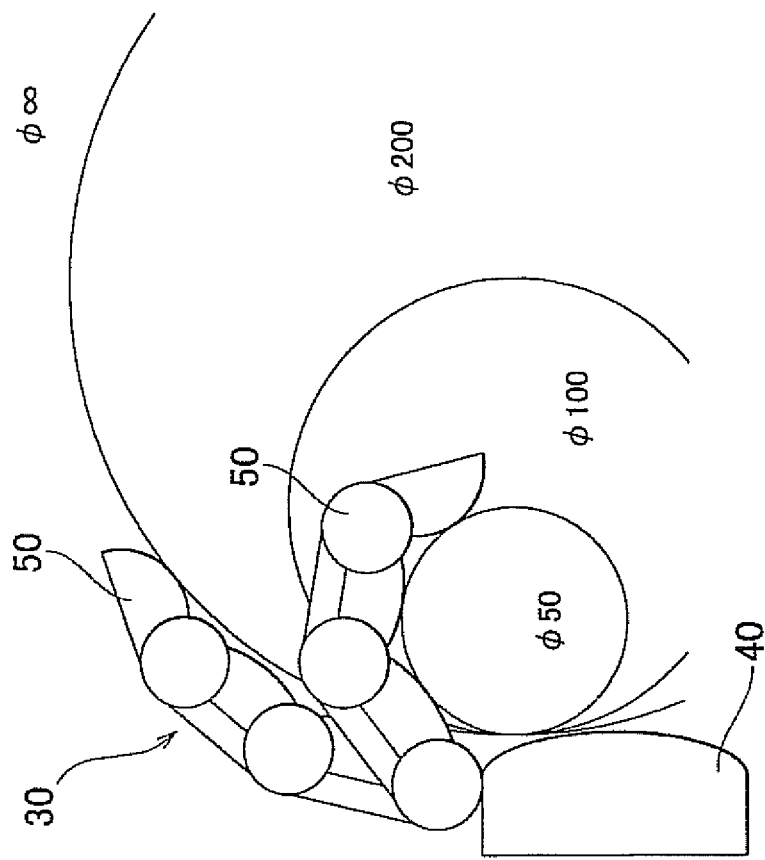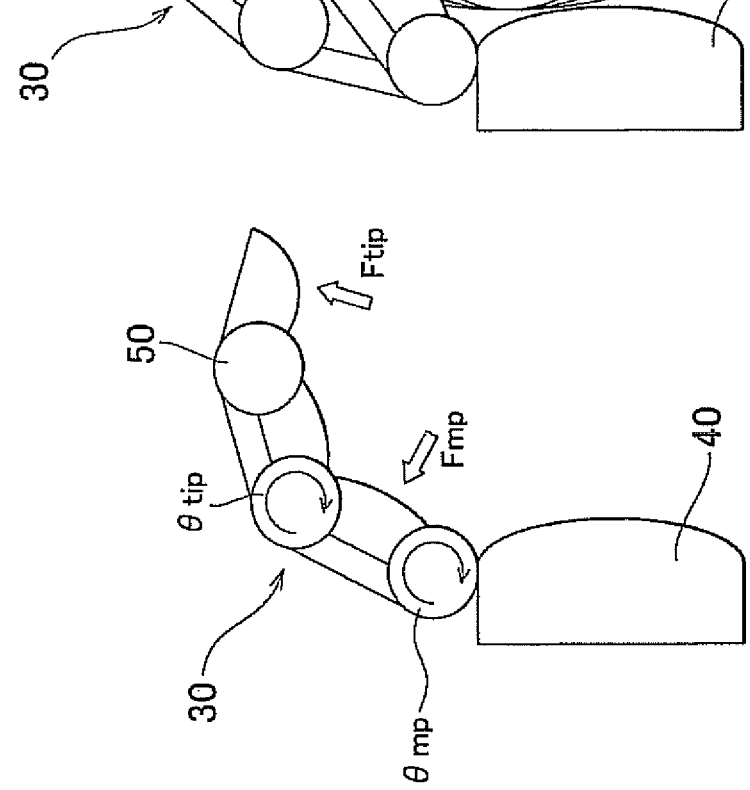

O

O'

O"  P

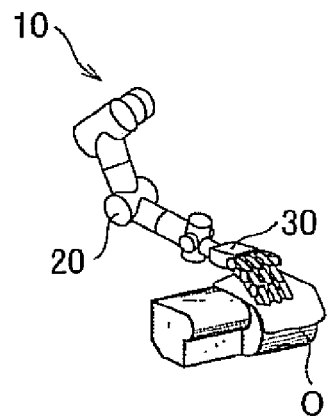
F I G . 20A
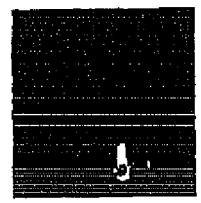
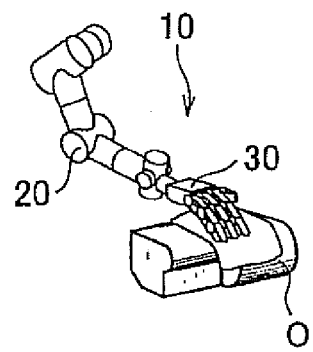
F I G . 20B
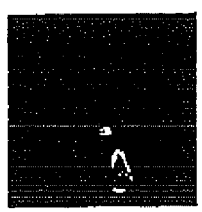
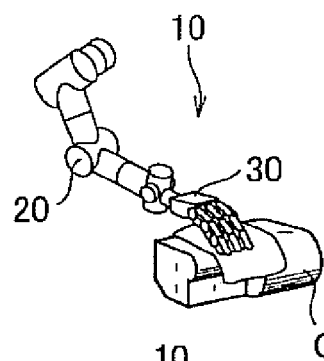
F I G . 20C
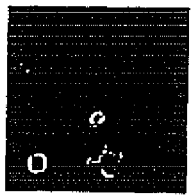
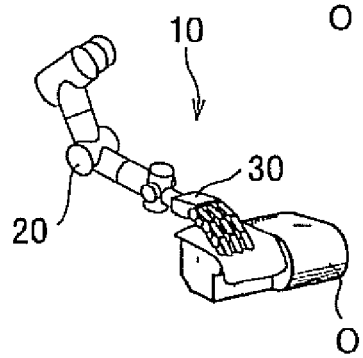
F I G . 20D

FIG. 23A 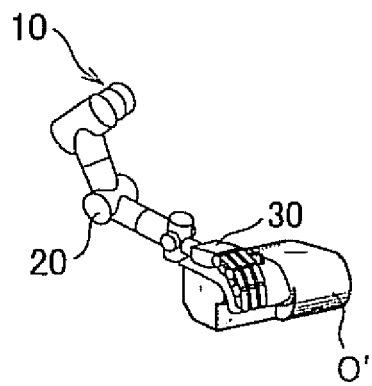 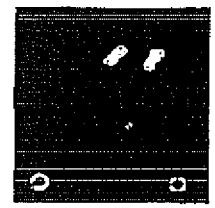
FIG. 23B 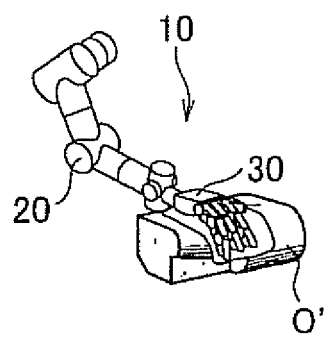 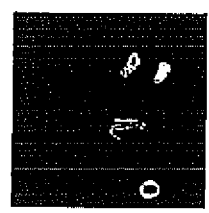
FIG. 23C 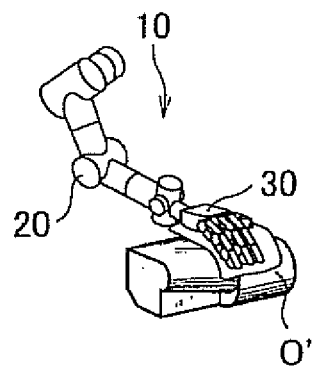 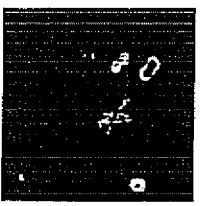
FIG. 23D 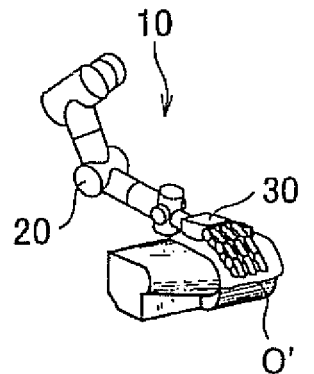 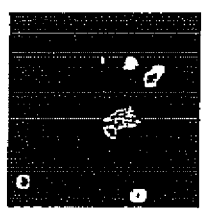

F I G . 25
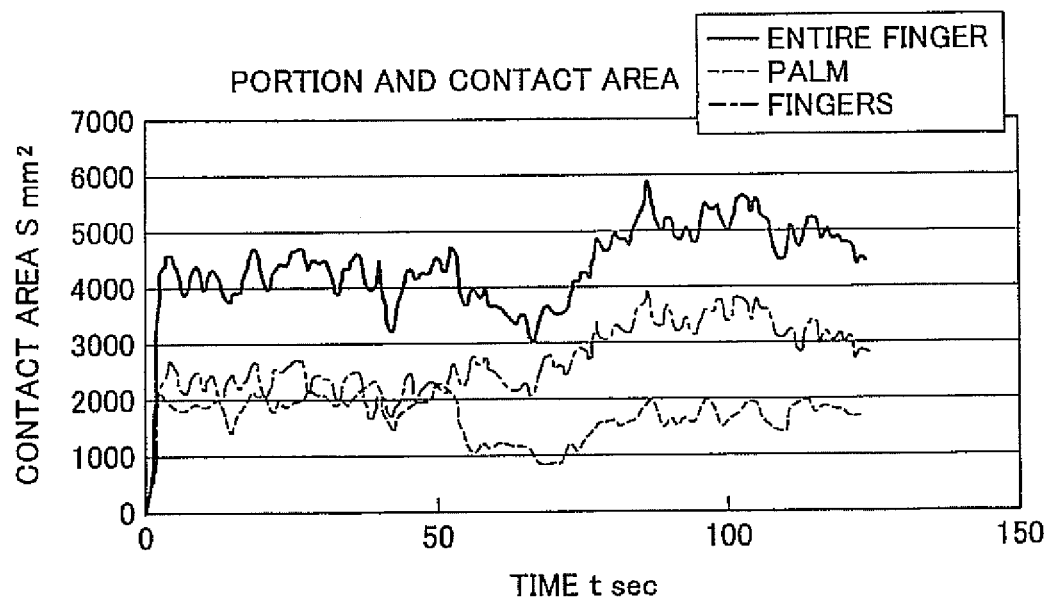

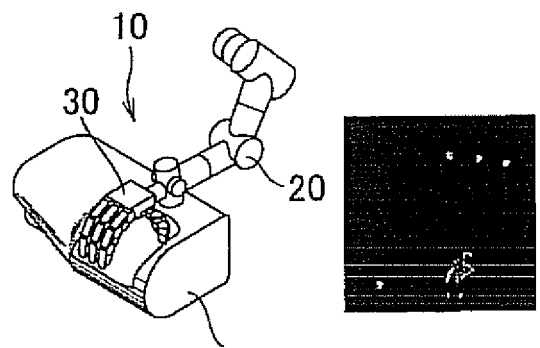
F I G. 27A
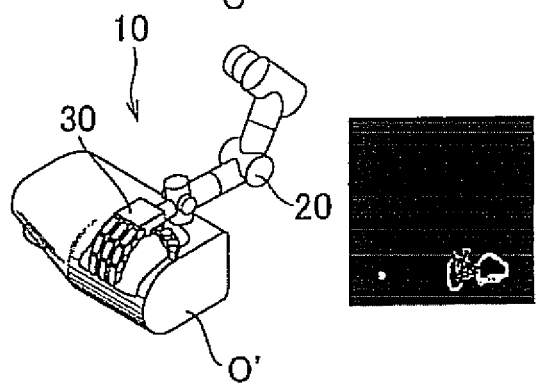
F I G. 27B
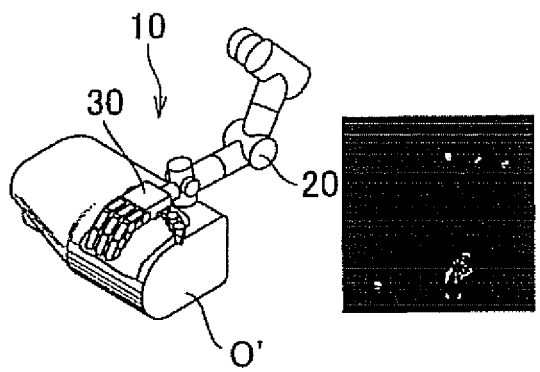
F I G. 27C
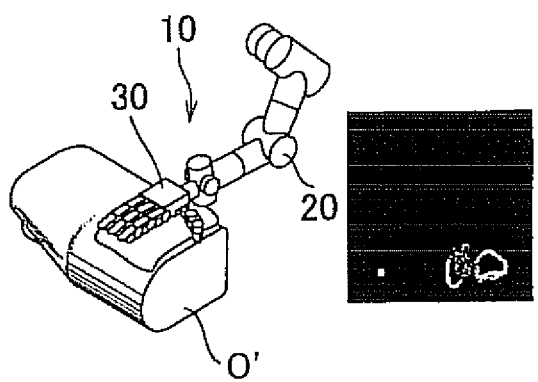
F I G. 27D F I G . 28
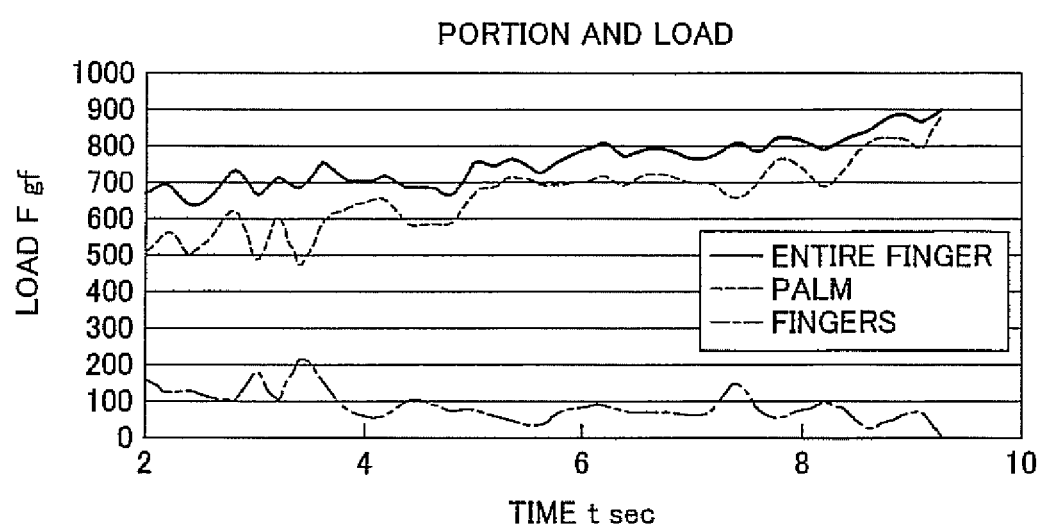

FIG. 30A 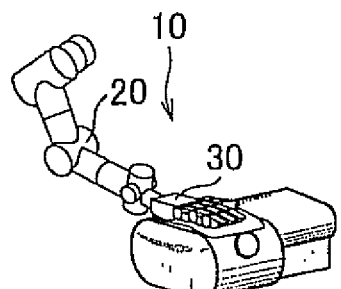 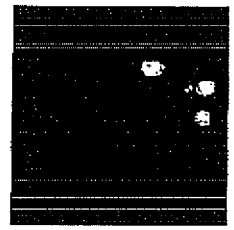
FIG. 30B 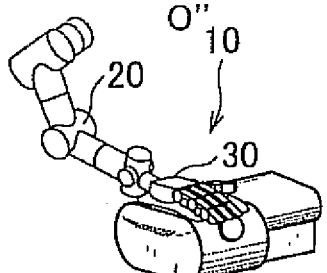 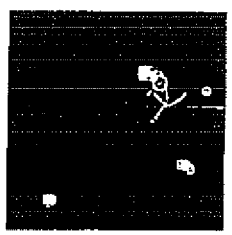
FIG. 30C 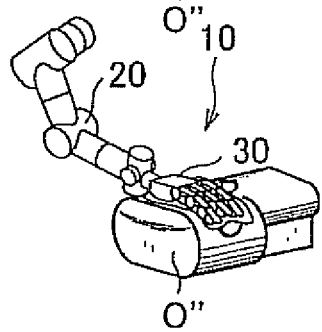 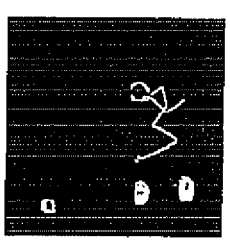
FIG. 30D 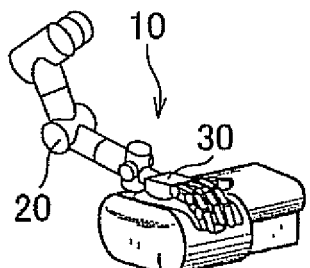 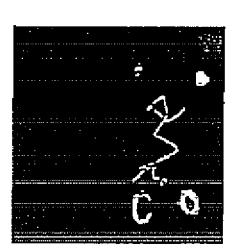
FIG. 30E 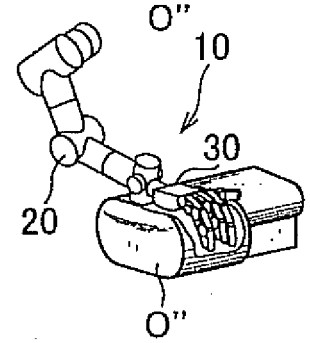 

F I G . 32
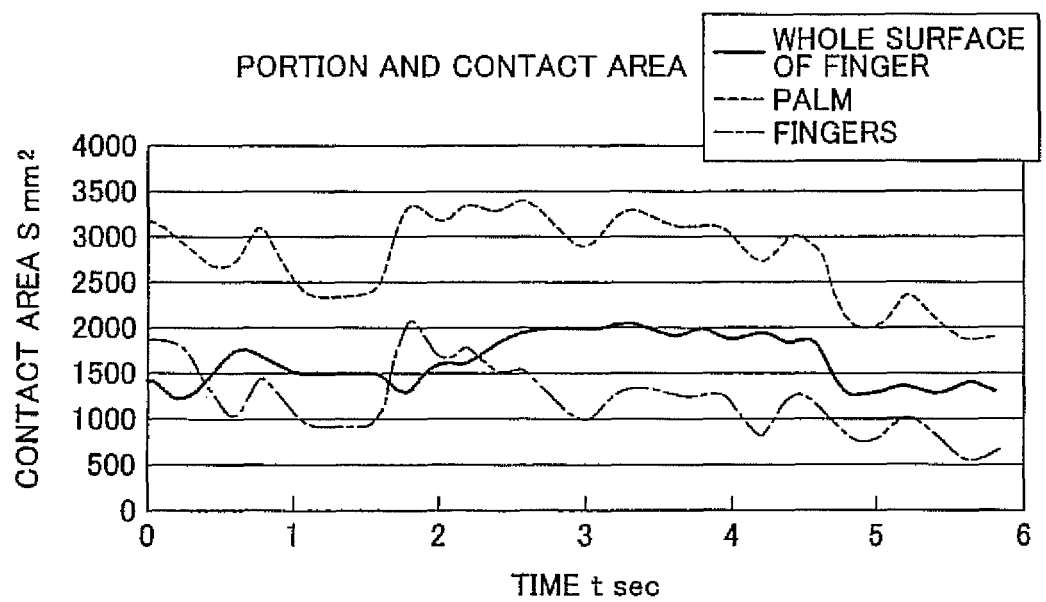

8,442,678 B2

ROBOTIC DEVICE

INCORPORATION BY REFERENCE

The disclosure of Japanese Patent Application No. 2008-309798 filed on Dec. 4, 2008, including the specification, drawings and abstract is incorporated herein by reference in its entirety.

BACKGROUND OF THE INVENTION

1. Field of the Invention

The invention relates to a robotic device. More particularly, the invention relates to a robotic device having an arm and a hand.

2. Description of the Related Art

A robotic device having an arm and a hand has been proposed, the practical use of which is anticipated in not only industrial fields, but a variety of fields such as healthcare, agriculture, and safety systems. In particular, in the field of healthcare, the working population is expected to decrease and the number of those requiring nursing care is expected to increase with the declining birthrate and the aging population, so expectations are high for robotic devices that coexist with people and assist with actual work in the same environment as people.

For example, in nonpatent reference 1 (Sasaki, Daisuke; Noritsugu, Toshiro; and Takaiwa, Masahiro. Development of Pressure Measurement Type Tactile Soft Sensor for Live Assist Robot. Japan Society of Mechanical Engineers, Transactions of the Japan Society of Mechanical Engineers, C 70 (689) pp. 77-82, January 2004), a robotic device is proposed in which a pressure sensor is arranged on the end of a finger of a multi-fingered hand which is attached to the end of a robot arm. The robot device proposed in nonpatent reference 1 wipes the forearm of a person by moving the arm along the forearm of the person while simultaneously controlling the finger joints of the fingers on the hand so that the pressing force detected by pressure sensors in the fingertips matches a target value while the fingertips are touching the forearm of the person.

However, with the robotic device according to the technology described above, only the fingertips contact the object, e.g., the forearm, of the person so the contact area is small which translates into poor work efficiency. That is, in the technology described above, the whole surface of the base (i.e., the palm) of the hand does not track (i.e., conform to) the surface of the object. However, when the entire surface of the hand does contact the object, the dynamic model with multipoint contact becomes complex. While the pressing force of the palm can be adjusted by force control of the arm, the force generated by the hand and the force generated by the arm affect one another so the relationship between the pressing force generated by force control of the arm and the pressing force that is actually generated over the entire area of the hand is not fixed. Therefore, it is necessary to have force control that coordinates the arm and the hand. However, it is difficult to perform force control for tracking the surface of the object with the whole surface of the hand in which the arm is coordinated with the hand, based on an analysis of the complex dynamic model of multipoint contact.

SUMMARY OF THE INVENTION

The invention thus provides a robotic device having an arm and a hand, which makes it possible to perform multipoint contact operations with the hand, such as tracking the surface of an object, as well as more easily control the pressing force according to multipoint contact with the hand.

A first aspect of the invention relates to a robotic device. This robotic device includes a first link portion, a second link portion that moves relative to the first link portion, a first contact load detecting portion that detects a contact load in a contact area of the first link portion, a second contact load detecting portion that detects a contact load in a contact area of the second link portion, and a first link portion control target setting portion that sets a control target for the first link portion. The first link portion control target setting portion sets the control target for the first link portion such that the difference between the detection value of the contact load of the first contact load detecting portion and the detection value of the contact load of the second contact load detecting portion decreases.

According to this structure, the difference between the contact load of the first link portion and the contact load of the second link portion decreases so a task according to multipoint contact such as tracking the surface of an object with the first link portion and the second link portion becomes possible and it is even easier to control the pressing force according to multipoint contact.

A second aspect of the invention relates to a robotic device. This robotic device includes a first link portion, a second link portion that moves relative to the first link portion, a movement detecting portion that detects at least one of the position or the posture of the second link portion with respect to the first link portion, a first contact load detecting portion that detects a contact load in a contact area of the first link portion, a second contact load detecting portion that detects a contact load in a contact area of the second link portion, and a first link portion control target setting portion that sets a control target for the first link portion. The first link portion control target setting portion sets the control target for the first link portion based on the detection value of the contact load of the first contact load detecting portion, the detection value of the contact load of the second contact load detecting portion, and at least one of the position or the posture of the second link portion with respect to the first link portion detected by the movement detecting portion.

According to this structure, the contact load of the first link portion, the contact load of the second link portion, and at least one of the position or the posture of the second link portion with respect to the first link portion are fed back to set the control target for the first link portion. As a result, a task according to multipoint contact such as tracking the surface of an object with the first link portion and the second link portion becomes possible and it is even easier to control the pressing force according to multipoint contact.

A third aspect of the invention relates to a robotic device. This robotic device includes an arm, a hand at the end of the arm, and an arm control target setting portion that sets a control target for the arm. The hand includes a base portion that is attached to the end of the arm, at least one link portion capable of moving with respect to the base portion, a base pressing force detecting portion that detects pressing force at two or more points in a contact area of the base portion against a surface of an object, a link pressing force detecting portion that detects pressing force at a point in the contact area of the link portion against the surface of the object, and a link movement detecting portion that detects at least one of the position or the posture of the link portion with respect to the base portion. Also, the arm control target setting portion sets the control target for the arm based on the pressing force at the point in the contact area of the base portion detected by the base pressing force detecting portion, the pressing force at the point in the contact area of the link portion detected by the link pressing force detecting portion, and at least one of the position or the posture of the link portion with respect to the base portion detected by the link movement detecting portion.

According to this structure, it is possible to detect various information of the hand, such as the pressing force at two or more points in the contact area of the base portion, the pressing force at a point in the contact area of the link portion, and at least one of the position or the posture of the link portion with respect to the base portion. Furthermore, the arm control target setting portion sets the control target for the arm based on the pressing force at the point in the contact area of the base portion detected by the base pressing force detecting portion, the pressing force at the point in the contact area of the link portion detected by the link pressing force detecting portion, and at least one of the position or the posture of the link portion with respect to the base portion detected by the link movement detecting portion. Therefore, the arm is controlled while feeding back the various information of the hand, so a task according to multipoint contact such as tracking the surface of an object becomes possible and it is even easier to control the pressing force according to multipoint contact.

A fourth aspect of the invention relates to a control method of a robotic device. The robotic device is provided with a first link portion and a second link portion that moves relative to the first link portion. The control method of this robotic device includes detecting a contact load in a contact area of the first link portion, detecting a contact load in a contact area of the second link portion, and setting the control target for the first link portion such that the difference between the detection value of the contact load in the contact area of the first link portion and the detection value of the contact load in the contact area of the second link portion decreases.

A fifth aspect of the invention relates to a control method of a robotic device. This robotic device is provided with a first link portion and a second link portion that moves relative to the first link portion. The control method of this robotic device includes detecting at least one of the position or the posture of the second link portion with respect to the first link portion, detecting a contact load in a contact area of the first link portion, detecting a contact load in a contact area of the second link portion, and setting the control target for the first link portion based on the detection value of the contact load in the contact area of the first link portion, the detection value of the contact load in the contact area of the second link portion, and at least one of the position or the posture of the second link portion with respect to the first link portion.

A sixth aspect of the invention relates to a control method of a robotic device. The robotic device is provided with an arm and a hand which is provided at the end of the arm and has a base portion that is attached to the end of the arm, and at least one link portion that is capable of moving with respect to the base portion. The control method of this robotic device includes detecting pressing force at two or more points in a contact area of the base portion against a surface of an object, detecting pressing force at a point in a contact area of the link portion against the surface of the object, detecting at least one of the position or the posture of the link portion with respect to the base portion, and setting the control target for the area based on the detected pressing force at the point in the contact area of the base portion, the detected pressing force at the point in the contact area of the link portion, and at least one of the detected position or the detected posture of the link portion with respect to the base portion.

The robotic device having an arm and a hand according to these aspects of the invention makes it possible to perform multipoint contact operations with the hand, such as tracking the surface of an object, as well as more easily control the pressing force according to multipoint contact with the hand.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 12 is a view of a finger operation under finger compliance control;

FIG. 13A is a view of the movement of each joint of a finger and the pressure applied, and FIG. 13B is a view of the movement of the finger according to the size of the object;

FIGS. 20A to 20D are views of the movement of the manipulator and the pressure distribution in the contact area in test example 1;

FIGS. 23A to 23D are views of the movement of the manipulator and the pressure distribution in the contact area in test example 2;

FIG. 25 is a graph showing the contact area with respect to time for each part of test example 2;

FIGS. 27A to 27D are views of the movement of the manipulator tracking the surface of the object while moving in the direction away from the fingertips, and the pressure distribution in the contact area in test example 3

FIG. 28 is a graph showing the load with respect to time for each part in test example 3;

FIGS. 30A to 30E are views of the movement of the manipulator and the pressure distribution in the contact area in test example 4;

FIG. 32 is a graph showing the contact area with respect to time for each part in test example 4.

DETAILED DESCRIPTION OF EMBODIMENTS

In the example embodiment of the invention, the robotic device according to the invention is applied to a manipulator of a robotic device. The manipulator in this example embodiment is used in fields such as healthcare to perform tasks such as giving a person a sponge bath.

Figure 1:
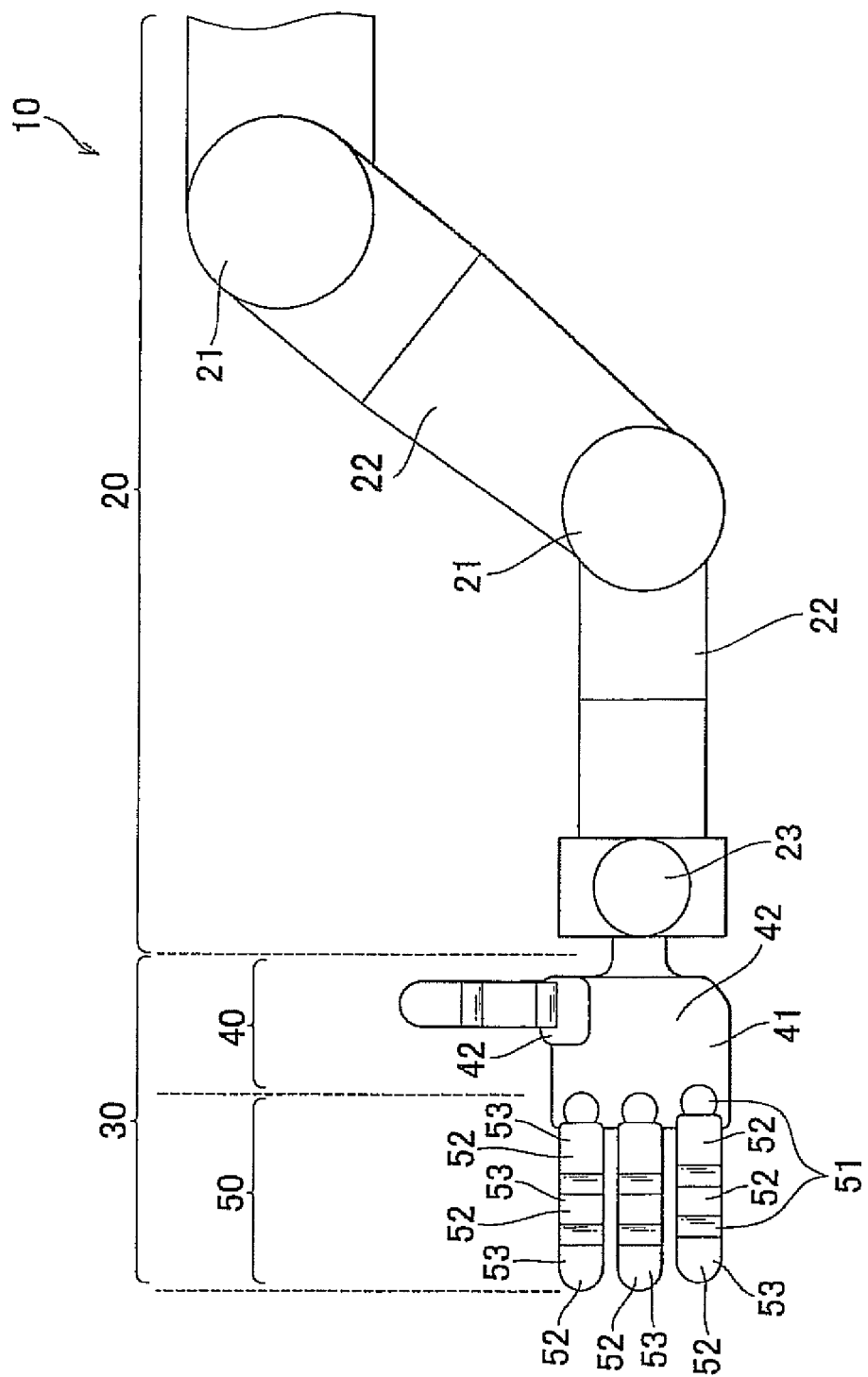
FIG. 1 is a side view of the structure of a manipulator according to an example embodiment of the invention.

FIG. 1 is a side view of the structure of the manipulator according to this example embodiment. As shown in FIG. 1, the manipulator 10 of this example embodiment has an arm 20 and a hand 30 that is located at the end of the arm 20. The arm 20 has passive flexible joints 21 with six degrees of freedom at portions corresponding to the shoulder, elbow, and wrist of a human. Each passive flexible joint 21 houses a sensor that detects the angle of the respective joint to detect the posture of the arm 20. A mechanical spring is housed in each of the passive flexible joints 21. Accordingly, if a modeling error or environment recognition error occurs while the manipulator 10 is performing a task that involves contact with the environment, the passive flexible joints 21 are able to quickly and stably carry out their work while absorbing these errors with mechanical passivity. Also, the passive flexible joints 21 are excellent at tracking people, so it is possible to improve safety when in contact with people, e.g., force can be quickly reduced.

The arm 20 has an impact safety cover and contact sensor 22 on the surface to improve safety when in contact with people. This impact safety covering and contact sensor 22 also makes it possible to perform safety control using contact pressure information regarding the surface of the arm 20, as well as carry heavy objects and assist with work while contacting objects and the like with the surface of the arm 20. A force sensor 23 provided on the portion corresponding to the wrist of a human is a six-axis force sensor that is used to detect force applied to the object by the arm 20.

The hand 30 has a palm (i.e., a base portion) 40 that is attached to the end of the arm 20, and movable fingers 50 on the palm 40. The palm 40 has flexible flesh 41 to improve stability and tracking, as well as safety when in contact with a person. A tactile sensor (i.e., a base pressing force detecting portion) 42, which is a distribution type pressure sensor, is provided on the whole surface of the palm 40. This tactile sensor 42 is able to detect pressing force at two or more locations in the contact area of the palm 40 against the surface of an object such as a person.

The fingers 50 consists of a total of four fingers. The finger that corresponds to the thumb of a person has two joints, including a joint at the heel of the palm 40, each joint having one degree of freedom. The other fingers each have three joints 51, including the joint at the heel of the palm 40, with each joint 51 having one degree of freedom. Each joint 51 has a force sensor (i.e., a link movement detecting portion) 52 which is used not only to detect force applied to an object by the each finger, but also to detect the position and posture of the fingers 50 with respect to the palm 40. Also, a tactile sensor (i.e., a link pressing force detecting portion) 53 which is a distribution type pressure sensor is provided over the whole surface of the fingers 50 so that it is possible to detect pressing force at a point within the contact area of each of the fingers 50 against the surface of an object such as a person.

Figure 2:
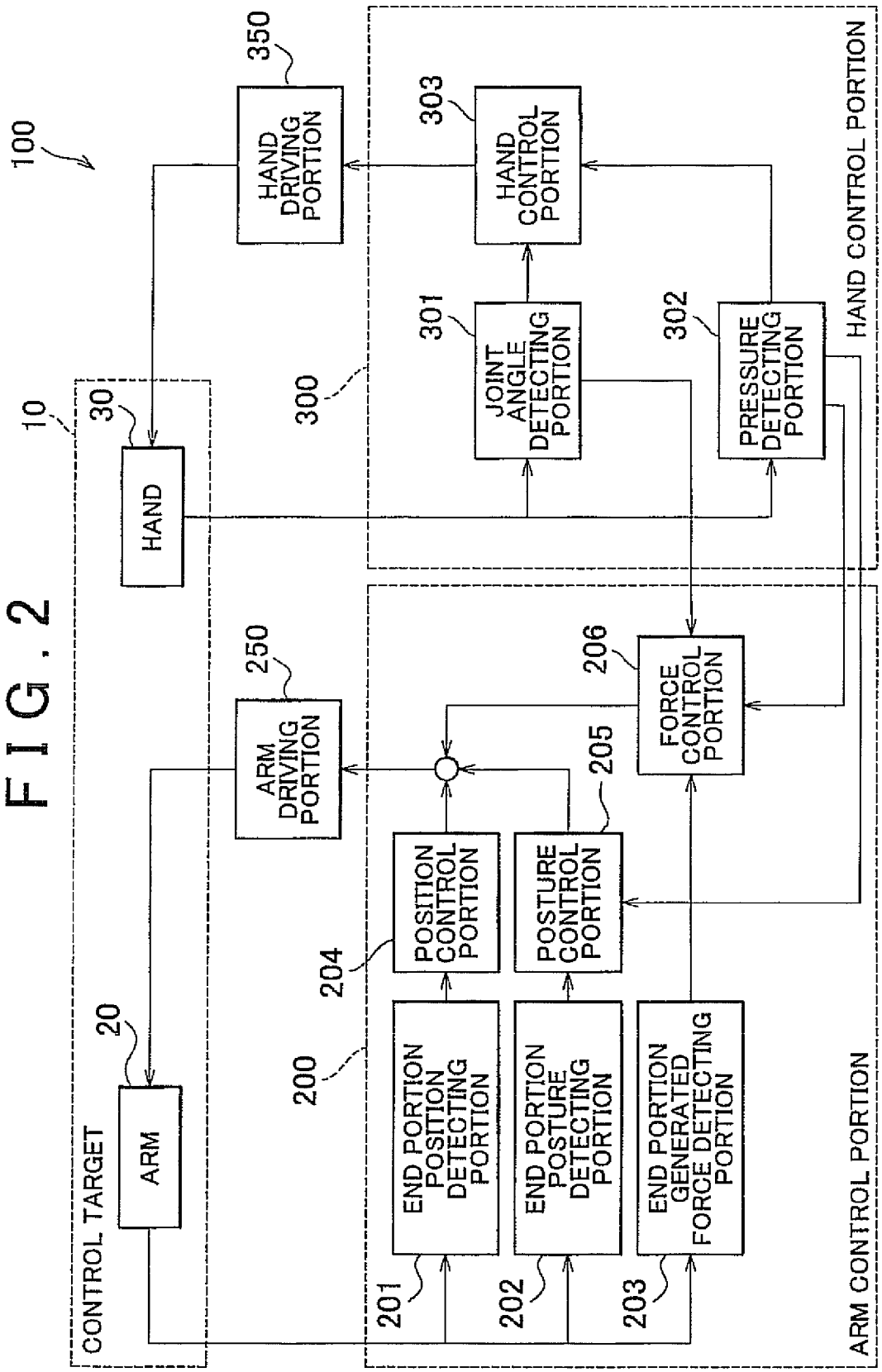
FIG. 2 is a block diagram of a control system of the manipulator according to the example embodiment.

FIG. 2 is a block diagram of a control system of the manipulator 10 according to the example embodiment. As shown in FIG. 2, the manipulator control system 100 has an arm control portion (i.e., an arm control target setting portion) 200 for the arm 20 of the manipulator 10 which is the control target, and a hand control portion (i.e., a hand control target setting portion) 300 for the hand 30 of the manipulator 10 which is the control target. An end portion position detecting portion 201 of the arm control portion 200 receives a signal related to the end portion position of the arm 20 from the arm 20, an end portion posture detecting portion 202 of the arm control portion 200 receives a signal related to the end portion posture of the arm 20 from the arm 20, and an end portion generated force detecting portion 203 of the arm control portion 200 receives a signal related to the end portion generated force of the arm 20 from the arm 20.

A detection signal from the end portion position detecting portion 201 is processed by a position control portion 204 of the arm control portion 200, and the position control portion 204 then calculates a target control value for the position of the arm 20. A detection signal from the end portion posture detecting portion 202 is processed by a posture control portion 205 of the arm control portion 200, and the posture control portion 205 then calculates a target control value for the posture of the arm 20 based on that detection signal. Also, the posture control portion 205 also receives a detection signal related to the pressing force of the palm 40 of the hand 30 from a pressure detecting portion 302 of the hand control portion 300, and calculates a target control value for the posture of the arm based on that detection signal.

A detection signal from the end portion generated force detecting portion 203 is processed by a force control portion 206 of the arm control portion 200, and the force control portion 206 then calculates a target control value for the force to be applied by the arm 20 to the object based on that detection signal. Also, the force control portion 206 receives a detection signal related to the position and posture of the fingers 50 with respect to the palm 40 from a joint angle detecting portion 301 of the hand control portion 300. The force control portion 206 then calculates a target control value for the force to be applied to the object by the arm 20 based on that detection signal. Furthermore, the force control portion 206 receives a detection signal related to the pressing force of the fingers 50 on the hand 30 from a pressure detecting portion 302 of the hand control portion 300. The force control portion 206 then calculates a target control value for the force to be applied to the object by the arm 20 based on that detection value.

The position control portion 204, the posture control portion 205, and the force control portion 206 of the arm control portion 200 each output their respective target control values to an arm driving portion 250 and control the arm 20.

Meanwhile, the joint angle detecting portion 301 receive signals related to the joint angles of the fingers 50 on the hand 30 from the hand 30, and the pressure detecting portion 302 of the hand control portion 300 receive signals related to the pressing force of the palm 40 and the fingers 50 from the hand 30. Detection signals related to the joint angles of the fingers 50 from the joint angle detecting portion 301 and detection signals related to the pressing force of the palm 40 and the fingers 50 from the pressure detecting portion 302 are processed by a hand control portion 303, which then calculates target control values for the joint angles of the fingers 50 and the pressing force of the palm 40 and the fingers 50 based on those detection signals.

The joint angle detecting portion 301 outputs detection signals related to the position and posture of the fingers 50 with respect to the palm 40 to the force control portion 206 of the arm control portion 200, as described above. Also, the pressure detecting portion 302 outputs a detection signal related to the pressing force of the fingers 50 of the hand 30 to the force control portion 206 of the arm control portion 200, as described above. Furthermore, the pressure detecting portion 302 outputs a detection signal related to the pressing force of the palm 40 to the posture control portion 205 of the arm control portion 200, as described above.

The hand control portion 303 outputs the various target control values to a band driving portion 350 and controls the hand 30.

Figure 3:
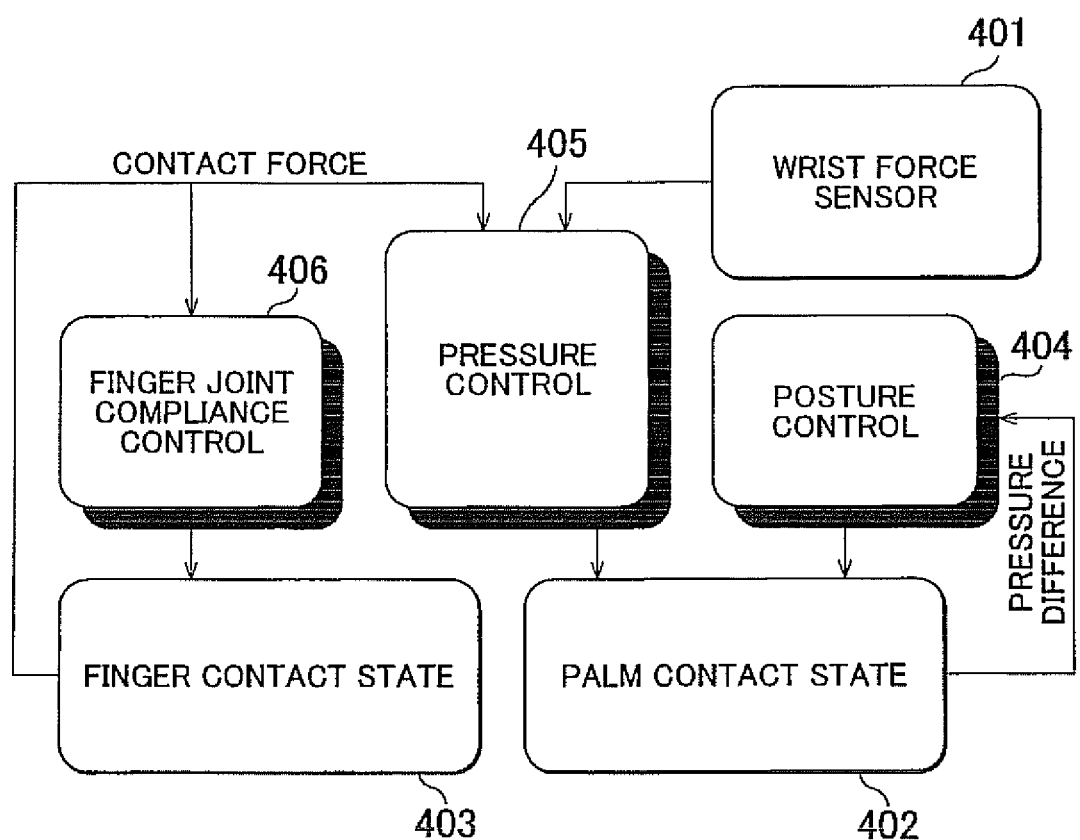
FIG. 3 is a block diagram of the control architecture for coordinating the arm and fingers according to the example embodiment.

FIG. 3 is a block diagram of the control architecture for coordinating the fingers and the arm according to this example embodiment. As shown in FIG. 3, a detection signal from a wrist force sensor 401 is used for pressure control 405. A pressure difference in a palm contact state 402 is used for posture control 404 and is fed back to control the palm contact state 402. Contact force in a finger contact state 403 is used for finger indirect compliance control 406 and is fed back to control the finger contact state 403. Moreover, contact force in the finger contact state 403 is also used for pressure control 405, and the palm contact state 402 is controlled according to this pressure control 405.

Figure 4:
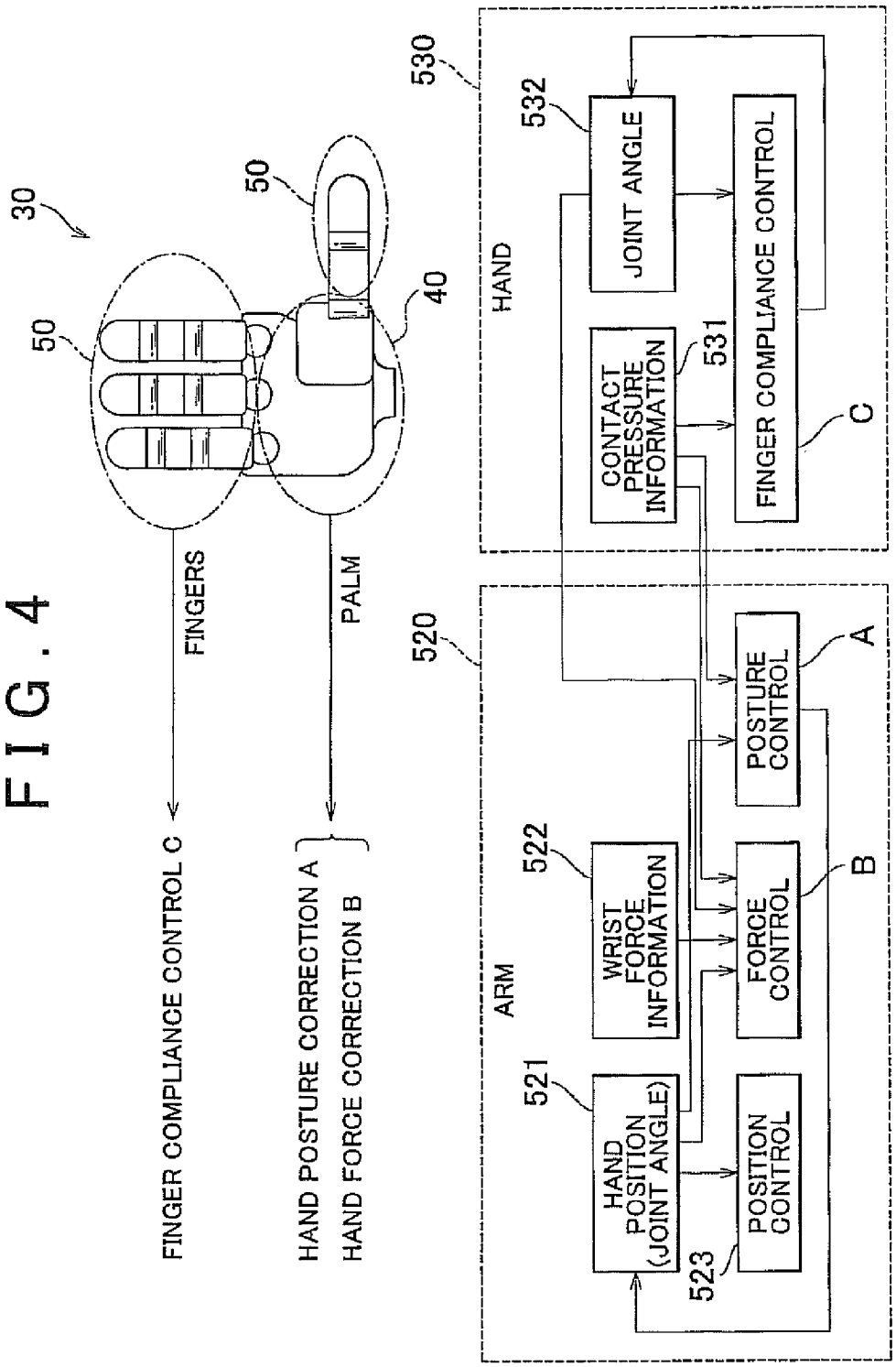
FIG. 4 is a diagram showing the overall control flow of the manipulator according to the example embodiment.

In this example embodiment, to facilitate understanding, the hand 30 is divided into two main portions so that the entire hand 30 contacts the object. FIG. 4 is a diagram showing the overall control flow of the manipulator according to this example embodiment. As shown in FIG. 4, in this example embodiment, the hand 30 is divided into the palm 40 which is located at the base of the hand 30, and the fingers 50 which are located at the end of the hand 30.

First, contact by the palm 40 will be described. In this example embodiment, the contact state of the palm 40 is controlled by the fingertip joints of the arm 20. More specifically, three basic types of control are necessary, i.e., hand posture control A for eliminating uneven contact pressure with the palm 40, hand force correction control B for keeping the pressing force of the palm 40 constant, and finger compliance control C for having the fingers 50 track the surface of the object. In addition to these three basic types of control, control to move in the wiping direction is also necessary for the arm 20.

As shown in FIG. 4, the hand posture control A is performed based on the information of the hand position (i.e., the joint angle) 521 of the arm 520, and the contact pressure information 531 and the information of the joint angle 532 of the hand 530, and is fed back to the hand position 521 of the arm 520. The hand force correction control B is performed based on the hand position 521 and the wrist force information 522 of the arm 520, and the contact pressure information 531 and the joint angle 532 of the hand 530, and is fed back to the hand position 521 of the arm 520. The hand position 521 of the arm 520 is used in position control 532. The finger compliance control C is performed based on the contact pressure information 531 and the information of the joint angle 532 of the hand 530, and is fed back to the joint angle 532 of the hand 530. Each type of control will now be described in detail.

In this example embodiment, force control in the pressing direction of the arm 20, hand posture control for ensuring contact with the palm 40, and position control in the wiping direction are all necessary, so these will be performed by hybrid control, which will now be briefly described.

A potential field is set up so that attraction force is applied as translational force to the target position to apply a position controlling force vector $^R F_{Pos}$ to the portion of the robot that is to be controlled. The suffix R indicates that the force vector is expressed using a reference coordinate system. The strength of the attraction force uses Expression (1) below as a function of the difference $\Delta P$ between a target position $P_{ref} = [x_{ref}, y_{ref}, z_{ref}]^T$ and the current position $P = [xyz]^T$.

$$F_{Pos} = F_{Posmax}(1 - e^{-\alpha_{pos}\Delta P})\Delta P = |P_{ref} - P| = \{(x_{ref} - x)^2 + (y_{ref} - y)^2 + (z_{ref} - z)^2\}^{1/2} \quad (1)$$

Figure 5:
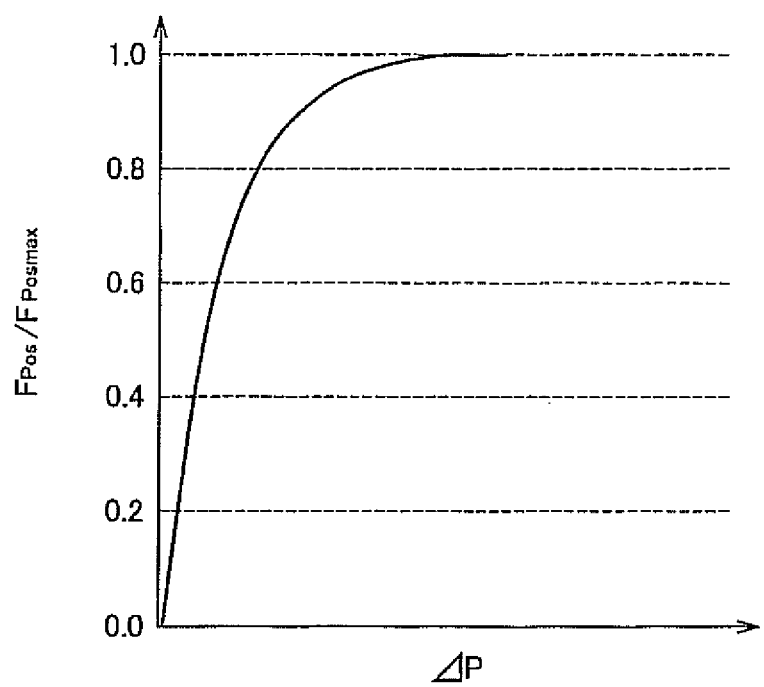
FIG. 5 is a graph showing a potential function for position control.

FIG. 5 shows the strength relationship between the difference and the attraction force. Using this function, the applied force at a point a certain distance away or more can be designated a fixed value $F_{Posmax}$, and the strength of the attraction force near the target value can be changed by adjusting $\alpha_{Pos}$.

In this way, the obtained attraction force is applied to the robot toward the target position according to Expression (2) below.

$$^R F_{Pos} = [F_{Pos,x}, F_{Pos,y}, F_{Pos,z}]^T = [\{(x_{ref} - x)/\Delta P\}F_{Pos}\{\{(y_{ref} - y)/\Delta P\}\}F_{Pos}\{\{(z_{ref} - z)/\Delta P\}\}F_{Pos}] \quad (2)$$

A potential field is set up so that attraction force is applied as a moment of force to the target posture to apply a posture controlling vector $^R M_{Ori}$ to the portion of the robot that is to be controlled. Before describing the method for creating the posture controlling vector in detail, the posture representation method and the rotation matrix, which are important for posture control, will be described.

The reference coordinate system will be designated $\Sigma_A$, its point of origin will be designated $O_A$, and three direct axes will be designated $X_A, Y_A$, and $Z_A$. Also, the coordinate system of the target posture will be designated $\Sigma_B$, its point of origin will be designated $O_B$, and three direct axes will be designated $X_B, Y_B$, and $Z_B$. Also, the unit vectors pointed in the directions $X_B, Y_B$, and $Z_B$ that are expressed using $\Sigma_A$ will be written as $^A x_B, ^A y_B$, and $^A z_B$. The target posture viewed from $\Sigma_A$ at this time can be expressed by $\{^A x_B, ^A y_B, ^A z_B\}$. Incidentally, the upper left suffix A indicates that that vector is expressed using the coordinate system $\Sigma_A$. Hereinafter, the upper left suffix of the vectors will follow this rule unless otherwise stated.

Here, the posture can be expressed by the three vectors $\{^A x_B, ^A y_B, ^A z_B\}$. These will be assembled in the form of the matrix $^A R_B = [^A x_B, ^A y_B, ^A z_B]$, which will be referred to as a rotation matrix.

$^A R_B$ contains nine variables among which there are three independent components. The rotation about a given fixed axis is construed as the result of three sequential rotations from the reference coordinate system $\Sigma_A$. The expression according to the Euler angle and the roll angle, the pitch angle, and the yaw angle is known as an expression that indicates the posture of $\Sigma_B$ with these three rotations. The only difference between the Euler angle and the roll angle, the pitch angle, and the yaw angle is the way that the rotational axes of the three rotations are viewed.

Hereinafter, the Euler angle that is used in this example embodiment will be described. i) First, the coordinate system in which $\Sigma_Z$ has been rotated an angle (j) about axis $Z_A$ is designated as coordinate system $\Sigma_{A'}$. Next, the coordinate system in which $\Sigma_{A'}$ has been rotated an angle θ about axis $Y_{A'}$ is designated as coordinate system $\Sigma_{A''}$. iii) Finally, the coordinate system in which $\Sigma_{A''}$ has been rotated an angle IP about axis $Z_{A''}$ is designated as coordinate system $\Sigma_B$.

At this time, the posture of the $\Sigma_B$ viewed from $\Sigma_A$ can be expressed by the set of three angles (φ, θ, and Ψ), which will be referred to as the Euler angle. The rotation matrix $^A R_B$ formed of the combination of these three rotations is as shown in Expression (3) below.

$$^A R_B = {}^A R_{A'} {}^{A'} R_{A''} {}^{A''} R_B = \begin{pmatrix} C_\phi & -S_\phi & 0 \\ S_\phi & C_\phi & 0 \\ 0 & 0 & 1 \end{pmatrix} \begin{pmatrix} C_\theta & 0 & S_\theta \\ 0 & 1 & 0 \\ -S_\theta & 0 & C_\theta \end{pmatrix} \quad (3)$$

$$\begin{pmatrix} C_\psi & -S_\psi & 0 \\ S_\psi & C_\psi & 0 \\ 0 & 0 & 1 \end{pmatrix} \begin{pmatrix} C_\phi C_\theta C_\psi - S_\phi S_\psi & -C_\phi C_\theta S_\psi - S_\phi S_\psi & C_\phi S_\theta \\ S_\phi C_\theta C_\psi + C_\phi S_\psi & -S_\phi C_\theta S_\psi + C_\phi S_\psi & S_\phi S_\theta \\ -S_\theta C_\psi & S_\theta S_\psi & C_\theta \end{pmatrix}$$

When controlling the posture of the robot, the target posture is not able to be realized using the Euler angle and the roll angle, the pitch angle, and the yaw angle as they are unless the three rotational axes are controlled in order. Therefore, it is evident that these angles cannot be used directly to control the posture by simultaneously applying the moments about the three axes.

Therefore, it is necessary to have a method of calculating a moment for reaching the target posture once for one given coordinate system. The posture can be expressed in several ways such as by the Euler angle and the roll angle, the pitch angle, and the yaw angle and the like, but the rotation matrix for posture is unique. This rotation matrix simply shows the relationship between one coordinate system and another coordinate system, so the posture will be determined based on this rotation matrix.

Basically, the posture of any part of the robot can be controlled, but to simplify the description here, a case will be described in which the hand posture $\Sigma_H$ is expressed by the Euler angle (φ, θ, Ψ) at the reference coordinate $\Sigma_R$. Also, if the target posture can be expressed with the rotation matrix, it may also be expressed by any of the Euler angle and the roll angle, the pitch angle, or the yaw angle.

The posture controlling force vector is created according to the process described below. 1) The rotation matrix of the target posture Φ=(φ, θ, Ψ) expressed using the reference coordinate system is obtained by the Euler angle.

$$^R R_{ref} = \begin{pmatrix} C_\phi C_\theta C_\psi - S_\phi S_\psi & -C_\phi C_\theta S_\psi - S_\phi S_\psi & C_\phi S_\theta \\ S_\phi C_\theta C_\psi + C_\phi S_\psi & -S_\phi C_\theta S_\psi + C_\phi S_\psi & S_\phi S_\theta \\ -S_\theta C_\psi & S_\theta S_\psi & C_\theta \end{pmatrix} \quad (4)$$

2) The rotation conversion matrix of the target posture is rewritten using the hand coordinate system.

$$^H R_{ref} = {}^H R_R {}^R R_{ref} \quad (5)$$

$$= ({}^R R_H)^{TR} R_{ref}$$

$$= \begin{bmatrix} R_{11} & R_{12} & R_{13} \\ R_{21} & R_{22} & R_{23} \\ R_{31} & R_{32} & R_{33} \end{bmatrix}$$

$$= [{}^H X_{ref} \quad {}^H Y_{ref} \quad {}^H Z_{ref}]$$

Figure 6A:
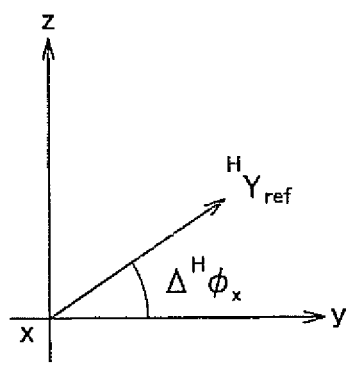
FIGS. 6A to 6C are graphs showing the axes of target posture coordinates on a hand coordinate system.
Figure 6B:
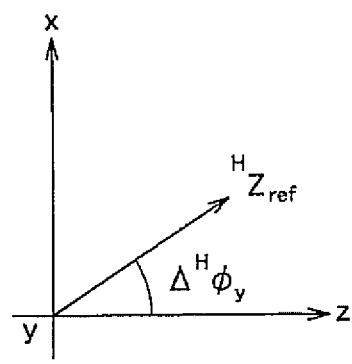
Figure 6C:
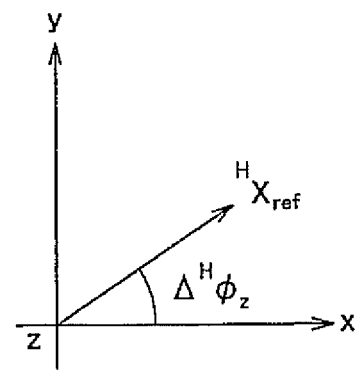

3) The difference $\{\Delta^H \Phi_x, \Delta^H \Phi_y, \Delta^H \Phi_z\}$ in the hand coordinate system of the unit vector $\{{}^H X_{ref}, {}^H Y_{ref}, {}^H Z_{ref}\}$ that corresponds to each axis of the target posture coordinate is calculated. The expression for calculating the difference $\{\Delta^H \Phi_x, \Delta^H \Phi_y, \Delta^H \Phi_z\}$ is shown in Expression (6) below. Also, FIGS. 6A to 6C show the axes of the target posture coordinates in the hand coordinate system.

$$\Delta^H \Phi_x = a \tan 2(R_{32}, R_{22}) \Delta^H \Phi_y = a \tan 2(R_{13}, R_{33})$$
$$\Delta^H \Phi_z = a \tan 2(R_{21}, R_{11}) \quad (6)$$

4) The target posture force vector corresponding to the difference about each axis is calculated by the hand coordinate system. At this time, the magnitude of the force vector is obtained by the same exponential function as that used to determine the magnitude of the position controlling force vector. With respect to the magnitude of the difference, the norm of the difference about each axis is used. This is also used when determining each component.

$$M_{Ori} = M_{Orimax}(1 - e^{-\alpha_{Ori} \Delta \Phi}) \Delta \Phi = (\Delta^H \Phi_x{}^2 + \Delta^H \Phi_y{}^2 + \Delta^H \Phi_z{}^2)^{1/2} M_{Ori} = [M_{Ori,x}, M_{Ori,y}, M_{Ori,z}]^T [(\Delta^H \Phi_x / \Delta \Phi) M_{Ori}(\Delta^H \Phi_y / \Delta \Phi) M_{Ori}(\Delta^H \Phi_z / \Delta \Phi) M_{Ori}]^T \quad (7)$$

5) When the target posture force vector expressed using the hand coordinate system is rewritten using the reference coordinate system, it is as shown in Expression (8) below.

$$^R M_{Ori} = {}^R R_H {}^H M_{Ori} \quad (8)$$

Many operations performed by a robot require not only precise control of the hand position, as is the case when opening and closing a door for example, but also control of the contact force with respect to the environment. Therefore, in this example embodiment, force control is performed using compliance control in which position control and posture control as the base can be built upon. Incidentally, in this example embodiment, force control is performed by compliance control but the control method is not limited to this.

Supposing that force is detected using the force sensor 23 housed in the wrist of the robot, the weight of the hand 30 itself must be cancelled out and the hand force must be estimated from the load applied to the wrist in order to control the hand force.

When the force sensor 23, which is a six-axis force sensor, is housed in the wrist, the force from the weight of the hand 30 itself is also constantly detected by the sensor, so this weight must be subtracted in order to calculate the external force. Thus, the weight of the hand 30 itself that is detected by the force sensor 23 is calculated.

When the position of the force sensor 23 at the wrist coordinates is $^W P_s = [x_{w-s}, y_{w-s}, z_{w-s}]$ and the center of gravity of the hand 30 is $^W P_{Hg} = [x_{w-Hg}, y_{w-Hg}, z_{w-Hg}]$, a homogeneous transformation matrix of the force sensor 23 and the weight of the hand 30 is obtained as shown in Expressions (9) and (10) below.

$$^{W}T_{S} = \begin{bmatrix} I & ^{W}P_{S} \\ 0 & 1 \end{bmatrix}, ^{R}T_{S} = ^{R}T_{W} \cdot ^{W}T_{S} = \begin{bmatrix} ^{R}R_{S} & ^{R}P_{S} \\ 0 & 1 \end{bmatrix} \quad (9)$$

$$^{W}T_{Hg} = \begin{bmatrix} I & ^{W}P_{Hg} \\ 0 & 1 \end{bmatrix}, ^{R}T_{Hg} = ^{R}T_{W} \cdot ^{W}T_{Hg} = \begin{bmatrix} ^{R}R_{Hg} & ^{R}P_{Hg} \\ 0 & 1 \end{bmatrix}. \quad (10)$$

Gravitational force applied to the center of gravity of the hand 30 expressed using the reference coordinate system is as shown in Expression (11) below.

$$^{R}F_{Hg \times Hg} = [00 - m_{Hg}]^{T}, ^{R}M_{Hg \times Hg} = [000]^{T} \quad (11)$$

When this is written using a gravity coordinate system of the hand 30, it can be written as shown in Expression (12) below.

$$^{Hg}F_{Hg,Hg} = ^{Hg}R_{R} \times ^{R}F_{Hg,Hg}, \; ^{Hg}M_{Hg,Hg} = ^{Hg}R_{R} \times ^{R}M_{Hg},$$
$$^{Hg}R_{R} = (^{R}R_{Hg})^{T} \quad (12)$$

Therefore, the weight $^{S}F_{s,Hg}$, $^{S}M_{s,Hg}$ of the hand 30 itself that is measured by the force sensor 23 which is a six-axis force sensor is obtained as shown in Expression (13) below.

$$\begin{bmatrix} ^{s}F_{s,Hg} \\ ^{s}M_{s,Hg} \end{bmatrix} = J_{Hg,s}^{T} \cdot \begin{bmatrix} ^{Hg}F_{Hg,Hg} \\ ^{Hg}M_{Hg,Hg} \end{bmatrix} \quad (13)$$

$$J_{Hg,s} = \begin{bmatrix} ^{Hg}R_{s} & -^{Hg}R_{s}[^{s}P_{Hg,s} \times] \\ 0 & ^{Hg}R_{s} \end{bmatrix}$$

$$^{s}T_{Hg} = ^{s}T_{r} \cdot ^{r}T_{Hg} = (^{r}T_{s})^{-1} \cdot ^{r}T_{Hg} = \begin{bmatrix} ^{s}R_{Hg} & ^{s}P_{Hg,s} \\ 0 & 1 \end{bmatrix}$$

$$^{Hg}R_{s} = (^{s}R_{Hg})^{T}$$

In Expression (13) above, the symbols [● and ×] indicate the relationship shown below with respect to an arbitrary three dimensional vector $a = [a_x a_y a_z]^T$.

$$[ax] = \begin{bmatrix} 0 & -a_z & a_y \\ a_z & 0 & -a_x \\ -a_y & a_x & 0 \end{bmatrix}$$

The load of the hand is calculated using the reference coordinate system based on the force of the wrist coordinate system detected by the force sensor of the wrist. First, the load applied to the band is calculated as shown in Expression (14) below using the hand coordinate system in the same manner that the weight of the hand 30 itself that is applied to the wrist is calculated.

$$\begin{bmatrix} ^{H}F_{H,ext} \\ ^{H}M_{H,ext} \end{bmatrix} = J_{s,H}^{T} \cdot \begin{bmatrix} ^{s}F_{s,ext} \\ ^{s}M_{s,ext} \end{bmatrix} \quad (14)$$

$$J_{s,H} = \begin{bmatrix} ^{s}R_{H} & -^{s}R_{H}[^{H}P_{s,H} \times] \\ 0 & ^{s}R_{H} \end{bmatrix}$$

$$^{H}T_{s} = ^{H}T_{R} \cdot ^{R}T_{S} = (^{T}T_{H})^{-1} \cdot ^{R}T_{S} = \begin{bmatrix} ^{H}R_{s} & ^{H}P_{s,H} \\ 0 & 1 \end{bmatrix}$$

$$sRH = (^{H}R_{s})^{T}$$

Therefore, the hand force in the calculated hand coordinate system can be rewritten using the reference coordinate system as shown in Expression (15) below.

$$^{R}F_{H,ext} = ^{R}R_{H} \times ^{H}F_{H,ext}$$
$$^{R}M_{H,ext} = ^{R}R_{H} \times ^{H}M_{H,ext} \quad (15)$$

Controlling the translational force using virtual compliance control refers to controlling the position of the hand to realize a set hand compliance. The compliance is realized by offsetting the target hand position by an amount corresponding to virtual spring displacement from force. In this case, this virtual displacement is calculated. Incidentally, in this example embodiment, the translational force is controlled using virtual compliance control, but the control method is not limited to this.

When the target position is $P_{ref}$, the virtual spring displacement is $P_{cmp}$, and the corrected target position is $P_{ref'}$, Expression (16) below is satisfied.

$$P_{ref'} = P_{ref} + P_{cmp} \quad (16)$$

Thus, when the target hand force $^{R}F_{H,ref}$, the hand force $^{R}F_{H}$, and the hand compliance matrix $C_{H,P}$ are applied, the virtual spring displacement is obtained according to Expression (17) below.

$$P_{cmp} = C_{H,P}(^{R}F_{H,ref} - ^{R}F_{H}) \quad (17)$$

$$= \begin{bmatrix} C_{p,xx} & C_{p,xy} & C_{p,xz} \\ C_{p,yx} & C_{p,yy} & C_{p,yz} \\ C_{p,zx} & C_{p,zy} & C_{p,zz} \end{bmatrix} \left( \begin{bmatrix} F_{ref,x} \\ F_{ref,y} \\ F_{ref,z} \end{bmatrix} - \begin{bmatrix} F_{x} \\ F_{y} \\ F_{z} \end{bmatrix} \right)$$

Controlling the translational force through virtual compliance control refers to controlling the posture of the hand to realize a set hand compliance. When controlling the translational force, it is sufficient to offset the target hand position by an amount corresponding to the virtual spring displacement from force. However, with moment of force control, the current hand posture must always be used as the reference so the set hand compliance can be realized by correcting the difference between the current posture and the target posture. Incidentally, with this example embodiment, the translational force is controlled using virtual compliance control, but the control method is not limited to this.

When the target hand moment $^{R}M_{H,ref}$, the hand force $^{R}M_{H}$, and the virtual hand compliance $C_{H,\Phi}$ are applied using the reference coordinate system, the virtual spring displacement $^{R}\Phi_{cmp}$ in the reference coordinate system is obtained according to Expression (18) below.

$$^{R}\Phi_{cmp} = C_{H,\Phi}(^{R}M_{H,ref} - ^{R}M_{H}) \quad (18)$$

$$= \begin{bmatrix} C_{\Phi,xx} & C_{\Phi,xy} & C_{\Phi,xz} \\ C_{\Phi,yx} & C_{\Phi,yy} & C_{\Phi,yz} \\ C_{\Phi,zx} & C_{\Phi,zy} & C_{\Phi,zz} \end{bmatrix} \left( \begin{bmatrix} ^{R}M_{ref,x} \\ ^{R}M_{ref,y} \\ ^{R}M_{ref,z} \end{bmatrix} - \begin{bmatrix} ^{R}M_{x} \\ ^{R}M_{y} \\ ^{R}M_{z} \end{bmatrix} \right)$$

Moment of force control is made possible by converting this to the hand coordinate system and adding it to the difference between the current posture and the target posture, and then performing posture control. When the difference between the current posture and the target posture is denoted as $\Delta^{H}\Phi$, the virtual spring displacement is denoted as $^{H}\Phi_{cmp}$, and the corrected difference is denoted as $\Delta^{H}\Phi'$, Expression (19) below is satisfied.

$$\Delta^H \Phi' = \Delta^H \Phi + {}^H \Phi_{cmp} {}^H \Phi_{cmp} = ({}^R R_h)^{TR} \Phi_{cmp} \quad (19)$$

Figure 7A:
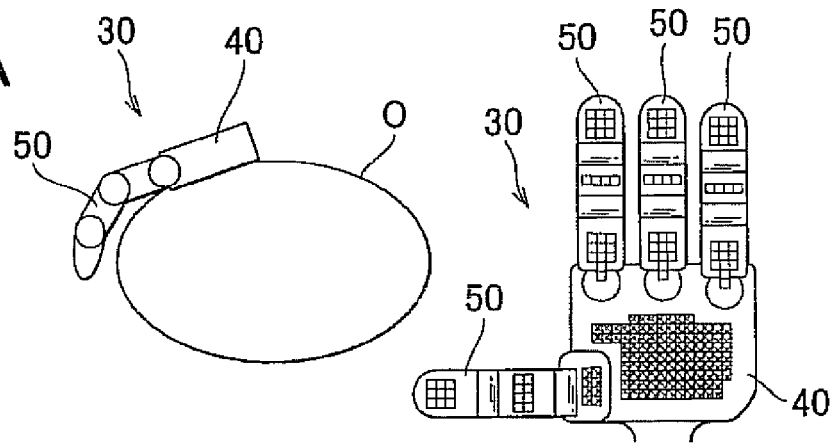
FIGS. 7A to 7C are diagrams showing the relationship between pressing force at each point and hand posture.
Figure 7B:
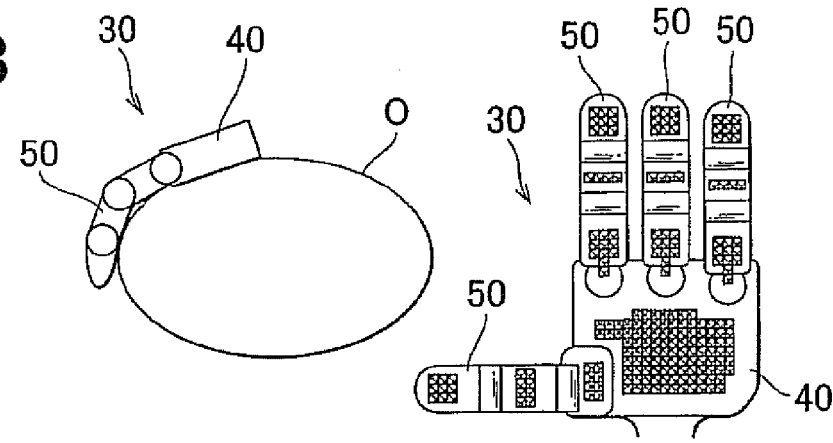
Figure 7C:
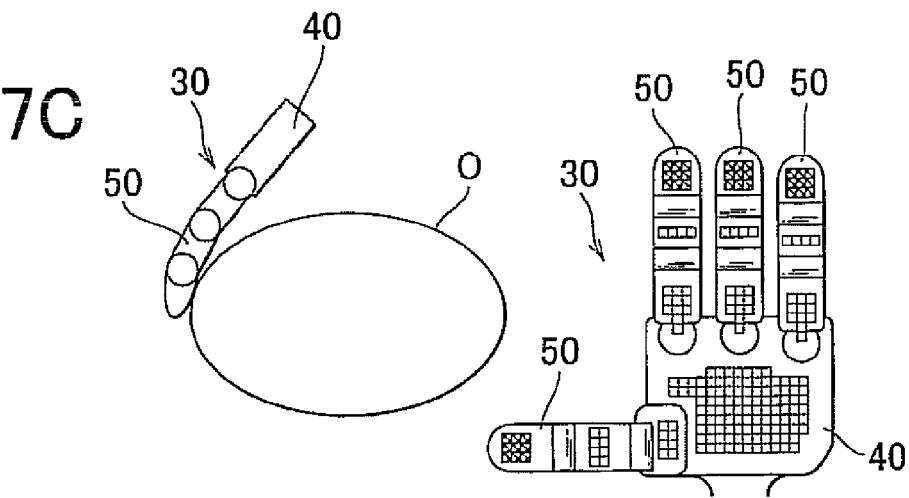

In this example embodiment, the hand posture correction is performed so that the whole surface of both the palm 40 and the fingers 50 contacts the object O evenly, as shown in FIG. 7B, instead of only just the palm 40 or only just the fingers 50 contacting the object O as shown in FIGS. 7A and 7C. First, the information used for this posture correction will be described.

Figure 8A:
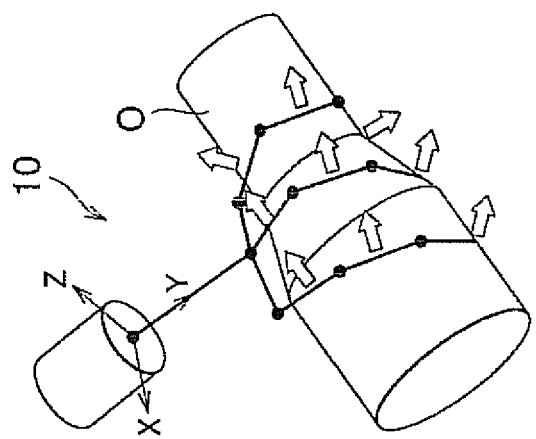
FIG. 8A is a view of single-point contact of the manipulator with respect to an object.

When performing control using the wrist force sensor while a contact model is treated as single-point contact shown in FIG. 8A, such as in the operation of tracking a surface in the related, the contact model is simple so the contact state can be uniquely obtained from the wrist force information. However, when considering a case in which there is multipoint contact, such as in an operation of tracking a surface using a multi-fingered hand, depending on the shape of the object O the finger posture may dynamically change and the row of fingers may flex greatly to wrap around the object O, such that internal force that acts toward the inside of the hand 30 is generated.

Figure 8B:
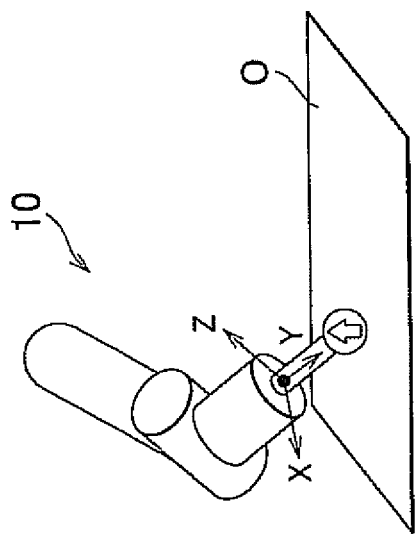
FIG. 8B is a view of multipoint contact of the manipulator with respect to an object.

As a result, the dynamic model becomes dramatically more complex and the contact state is no longer able to be uniquely obtained by simply the wrist force information. For example, in a case such as that shown in FIG. 8B, even though part of the palm 40 is not contacting the object O, the moment is balanced out in the wrist force sensor by the opposing internal force that is generated.

Therefore, in this example embodiment, the hand posture correction is performed using palm pressure distribution information instead of the wrist force information as it is in the related art.

Figure 9A:
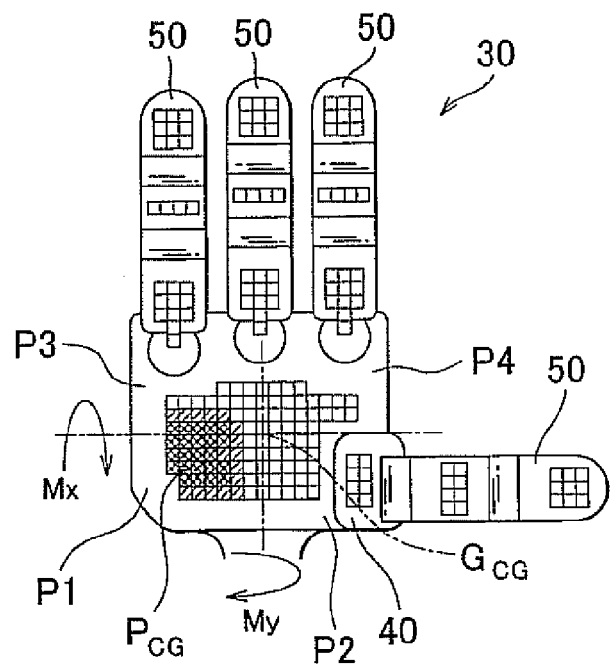
FIG. 9A is a view of the pressure distribution in the contact area of the hand.

The basic concept for correcting the posture in this example embodiment is to obtain the posture correcting moment so that the contact pressure center of gravity $P_{CG}$ of the palm 40 matches the geometric center of gravity $G_{CG}$ of the palm 40. The procedure for obtaining the posture correcting moment is to divide the tactile sensor 42 which is the pressure distribution sensor arranged on the palm 40 into four parts centered around the geometric center of gravity $G_{CG}$ and label the pressures in these parts P1, P2, P3, and P4, one for each part, as shown in FIG. 9A. Next, the correcting moments Mx and My are then calculated from the difference in the pressures applied to the upper and lower and left and right parts of the palm 40, as shown in Expression (20) below. Incidentally, in Expression (20), Kx and Ky are both arbitrary constants.

$$Mx = Kx\{(P1+P2)-(P3+P4)\}$$

$$My = Ky\{(P1+P3)-(P2+P4)\} \quad (20)$$

Figure 9B:
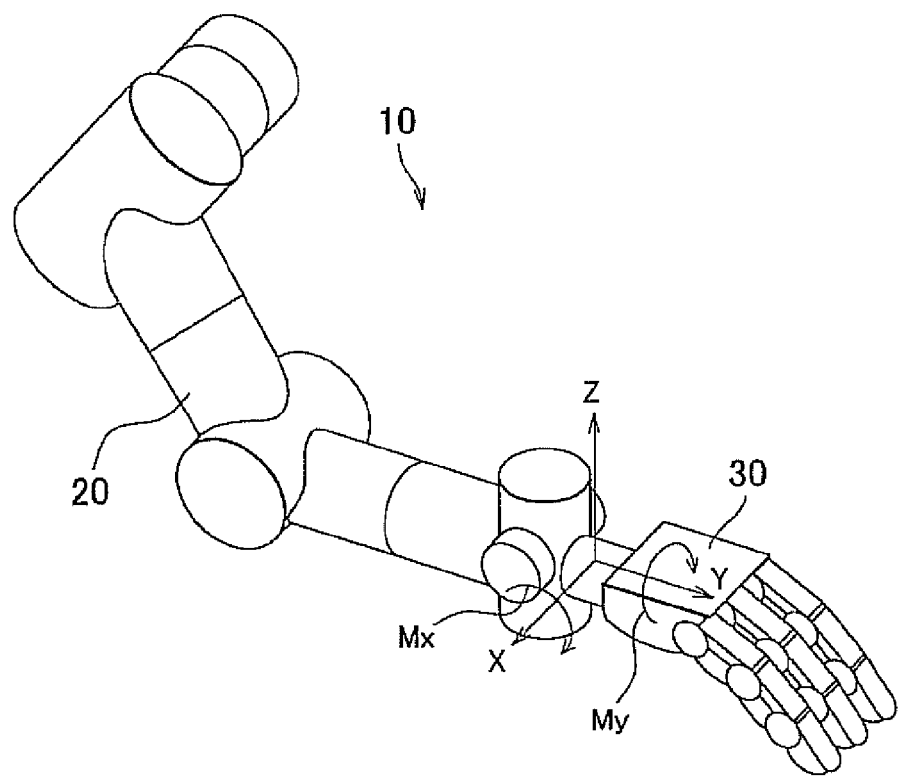
FIG. 9B is a view of a hand posture correction using the hand pressure distribution information.

In this example embodiment, the whole surface of the palm 40 is made to contact the object O by shifting to the balanced state using arm posture compliance control, as shown in FIG. 9B, based on the correcting moment obtained in this way. Incidentally, in this example embodiment, aside from obtaining the posture correcting moment such that the contact pressure center of gravity $P_{CG}$ of the palm 40 matches the geometric center of gravity $G_{CG}$ of the palm, it is also possible to set the control target such that a portion of the palm 40 presses especially strongly against the object O, for example. Alternatively, the control method described above may perform an arm posture correction using the pressure distribution information of the fingers 50. Moreover, considering the entire contact area, i.e., the contact area of the palm 40 combined with the contact area of the fingers 50, the pressure difference over the entire contact area may be reduced. In this case, control may be performed such that the geometric center of gravity and the contact pressure center of gravity of the entire contact area, i.e., the contact area of the palm 40 combined with the contact area of the fingers 50, approach one another and come to match.

Figure 10A:
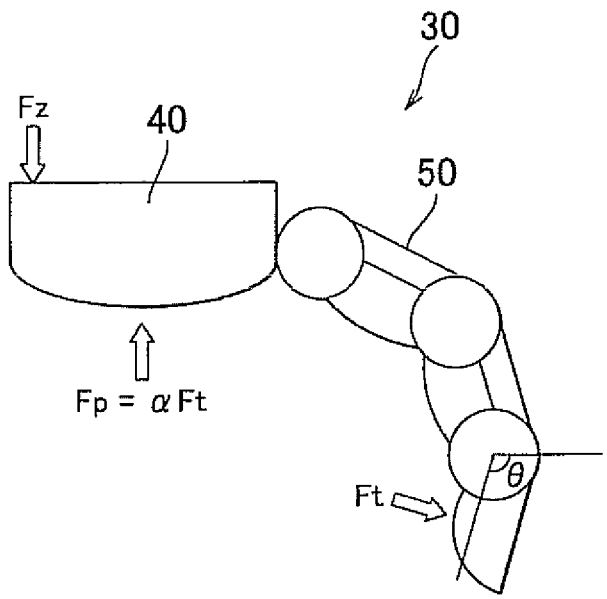
FIG. 10A is a view showing the change in the finger posture.
Figure 10B:
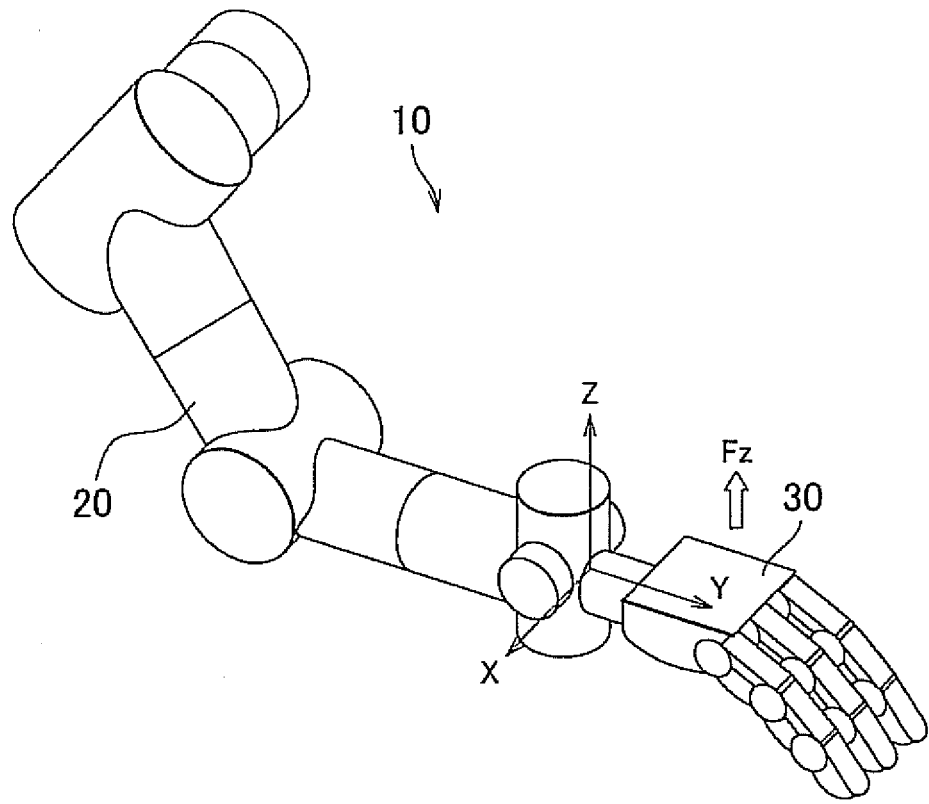
FIG. 10B is a view of hand force correction following a change in the finger posture.

The hand force correction is performed to keep the pressing force of the hand 30 constant regardless of the finger posture. With the operation of tracking a surface according to the related art, the shape of the end effector does not change so the hand force is constant. However, with an operation of tracking a surface using a multi-fingered hand, the finger posture will change depending on the shape of the object, so the hand force must also change accordingly. As shown in FIGS. 10A and 10B, the hand force is denoted as Fz, the palm load is denoted as Fp, the force of each finger is denoted as Fti (i=1 to 4), and the posture of each finger is denoted as θi (i=1 to 4). α is a constant obtained from the ratio of the area of the palm 40 to the area of the fingers 50.

Figure 11:
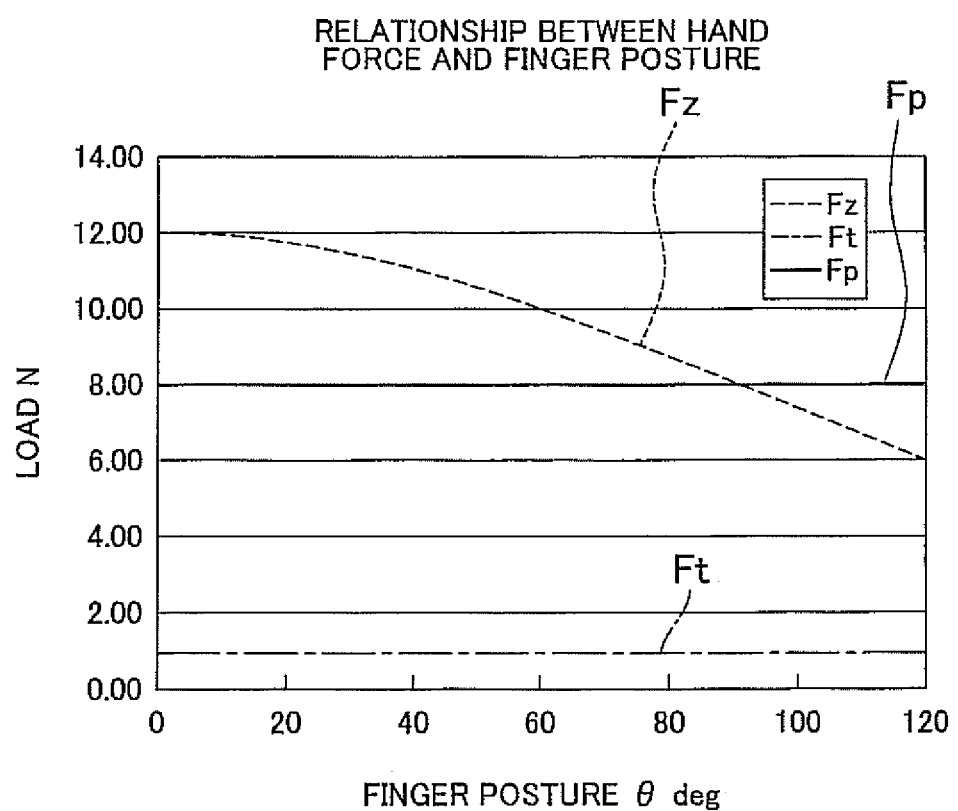
FIG. 11 is a graph showing the relationship between hand force and fingertip force.

Fz is obtained as shown in Expression (21) below. As is shown in FIG. 11, as the fingertip angle increases, the Fz direction component of the finger force shown in FIG. 10B decreases, so Fz also decreases. Fz and Fp balance out when the fingertip angle is 90 degrees. As a result, the pressing force over the entire hand 30 can be made constant regardless of the finger posture. Incidentally, in this example embodiment, it is possible to not only control the pressing force of the entire hand 30 so that it is constant, but also to control the pressing force so that it matches a predetermined target value.

$$Fz = Fp + \Sigma Fti \times \cos \theta i = \alpha \Sigma Fti + \Sigma Fti \times \cos \theta i \quad (21)$$

In order to wipe the object O safely and effectively, the whole surface of the hand 30 needs to contact the object O evenly. Contact with the palm 40 is accomplished with the hand posture and force correction control described above. Next, contact with the fingers 50 is accomplished with compliance control of the finger joints. Incidentally, in this example embodiment, finger compliance control is used, but the control method is not limited to this.

The palm 40 of the multi-fingered robot hand in this example embodiment is flat. This mechanical restriction makes it difficult to follow an object that is slightly curved with the whole surface of the palm 40. However, as shown in FIG. 12, the fingers 50 are formed from relatively small component parts. Also, because the fingers 50 have redundancy, it is possible to follow the surface of the object O relatively closely, as shown in FIGS. 13A and 13B, even when there are small indentations and protrusions on it. Furthermore, the joints in the fingers 50 are passive flexible joints which are structurally flexible, e.g., the whole surface of the palm 40 has a flexible covering, so they are able to follow the surface of the object O with good response even without any special control. In this way, the hand 30 in this example embodiment is hardware suitable for performing a task that involves tracking the surface of the object O.

However, as shown in FIGS. 13A and 13B, there is a limit to the possible extension angle of the flexible joints. If pressure equal to or greater than a certain pressure is applied, the flexible covering will also bottom out so it is unable to handle large displacement. Moreover, displacement and sudden load changes can be dealt with but the force is not being controlled, so it is difficult to keep the load that is applied to the object O constant.

Accordingly, in this example embodiment, finger compliance control that can accommodate even large displacement and keep the load constant is provided in addition to highly responsive structural flexibility.

Figure 14:
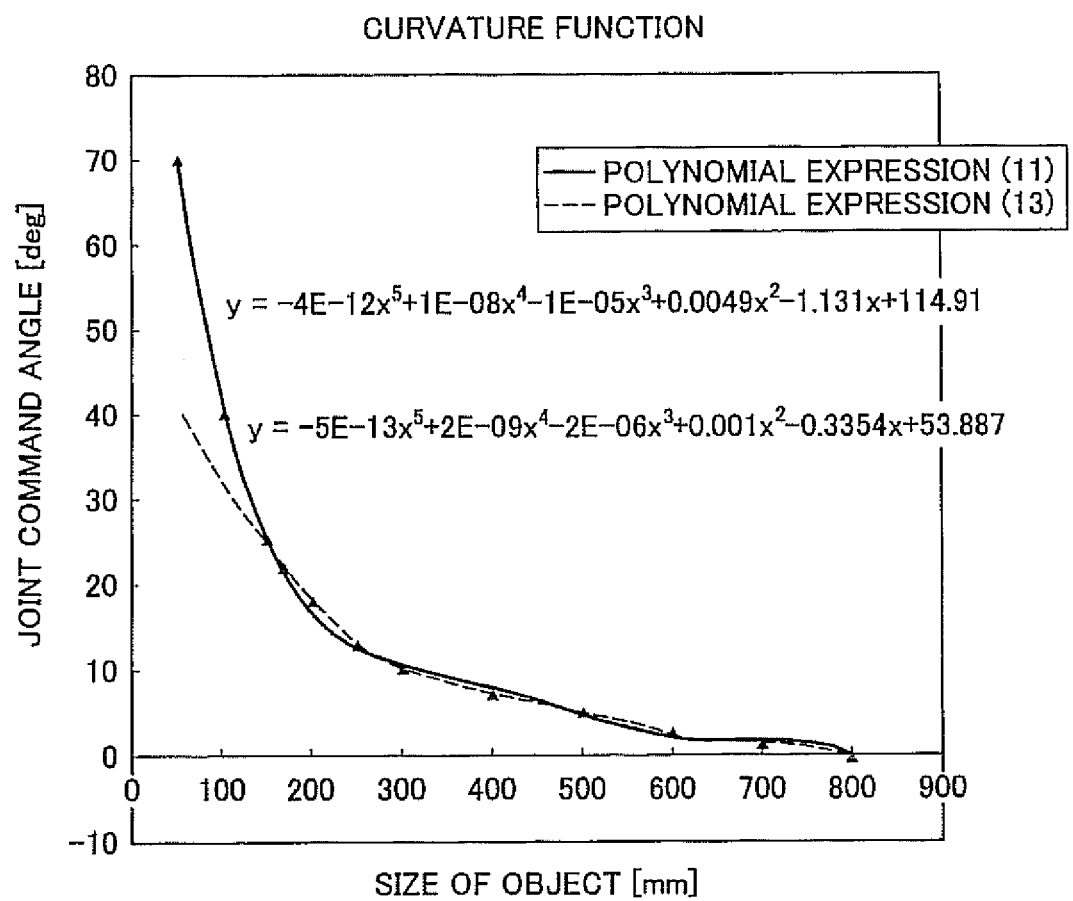
FIG. 14 is a graph of a curvature function of a joint command angle with respect to the size of the object.

There are a total of eight joints that are to be controlled, i.e., the joints MP and PIP of the multiple fingers, and the joints MP and IP of the thumb, as shown in FIG. 12. These joints are all controlled independently. The control method is such that, when the load applied to the segment and distal segment of a joint is greater than a fixed value, the base joint that is closest to that portion is made to extend, and when the load applied to the segment and distal segment of a joint is less than the fixed value, the base joint that is closest to that portion is made to flex. The command angle at this time is calculated using a curvature function. This curvature function is a function in which the joint angle is set to follow the curvature from 50 to ∞ mm of the object, as shown in FIG. 13B, and the relationship between the curvature and the joint angle is made into a function. As shown in FIG. 14A, a polynomial expression (I1) is satisfied for the base joint MP, and a polynomial expression (I3) is satisfied for the joint PIP.

According to this example embodiment, in the manipulator 10 that is provided with the arm 20, the hand 30 at the end of the arm 20, and the arm control portion 200 that sets the control target for the arm 20, the hand 30 has the palm 40 provided at the end of the arm 20, at least one finger 50 that is able to move with respect to the palm 40, the tactile sensor 42 that detects the pressing force at two or more points in the contact area of the palm 40 against the surface of an object O, the tactile sensor 53 that detects the pressing force at a point in the contact area of the finger 50 against the surface of the object O, and the force sensor 52 that detects the position and posture of the finger 50 with respect to the palm 40. Therefore, it is possible to detect various information of the hand 30, such as the pressing force at two or more points in the contact area of the palm 40, the pressing force at a point in the contact area of the finger 50, and the position and posture of the finger 50 with respect to the palm 40. Moreover, the arm control portion 200 sets the control target for the arm 20 based on the pressing force at the point in the contact area of the palm 40 which is detected by the tactile sensor 42, the pressing force at the point in the contact area of the finger 50 which is detected by the tactile sensor 53, and the position and posture of the finger 50 with respect to the palm 40 which is detected by the force sensor 52. Therefore, the arm 20 is controlled by feeding back the various information of the hand 30, which makes it possible to perform multipoint contact operations with the hand 30, such as a task that involves tracking the surface of an object, and makes it easier to control the pressing force according to multipoint contact of the hand 30.

Figure 33:
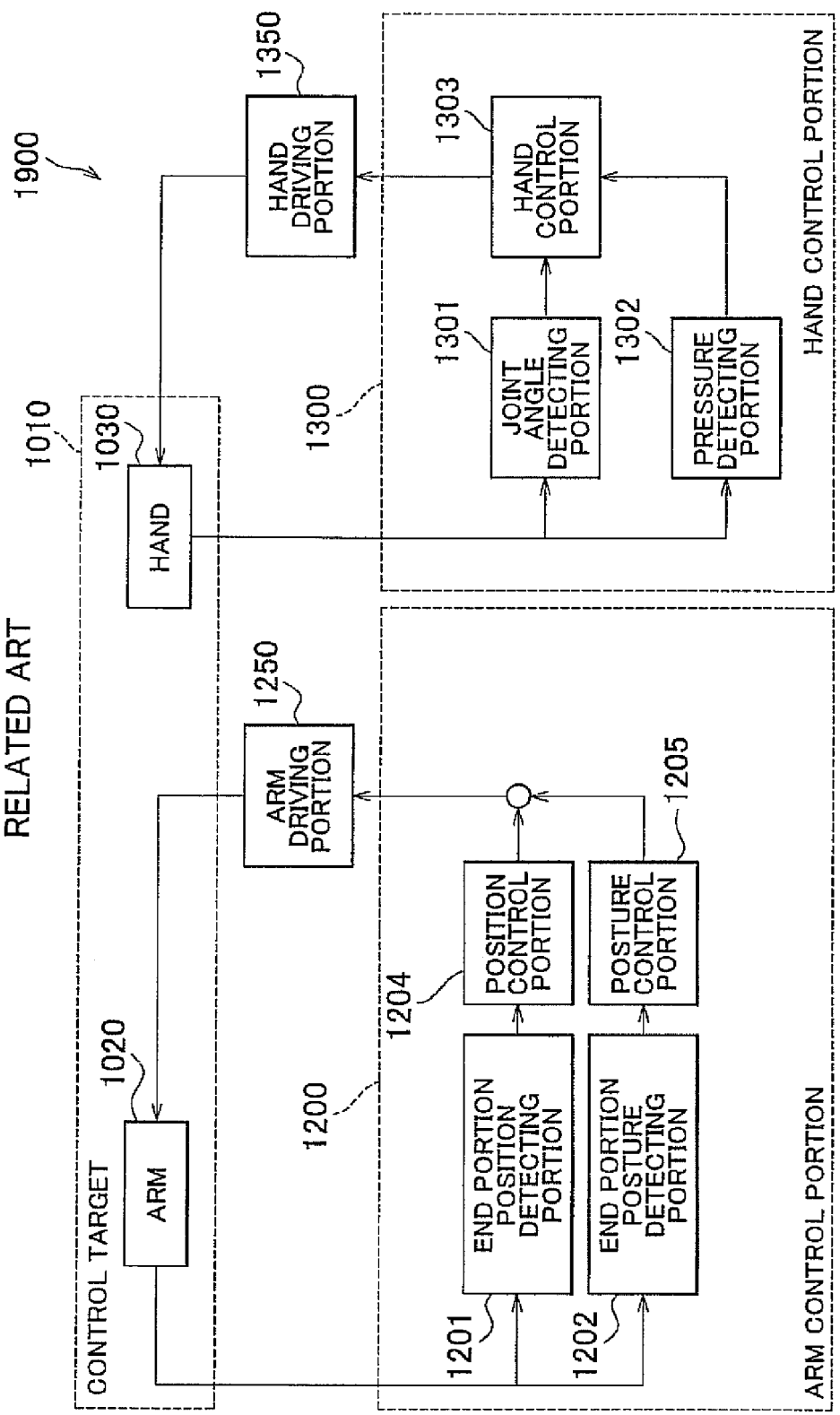
FIG. 33 is a block diagram of a control system of a manipulator according to related art.

That is, with a manipulator control system 1900 in the related art shown in FIG. 33, the arm control by the arm control portion 1200 is not coordinated with the hand control by the hand control portion 1300. As a result, only the fingers contact the object such as the forearm of a person, so the contact area is small which translates into poor work efficiency. However, with this example embodiment, force control is performed while coordinating the arm control by the arm control portion 200 with the hand control by the hand control portion 300, which makes it easy to perform both force control and an operation of tracking the surface of an object at multiple points.

Also, in this example embodiment, the arm control portion 200 sets the control target for the arm 20 so that the contact pressure distribution in the contact area of the palm 40 approaches the target distribution, e.g., so that the contact pressure center of gravity $P_{CG}$ in the contact area of the palm 40 matches the geometric center of gravity $G_{CG}$ in the contact area of the palm 40. Therefore, it is possible to realize pressure in which the contact pressure center of gravity $P_{CG}$ in the contact area of the palm 40 matches the geometric center of gravity $G_{CG}$ in the contact area of the palm 40. Thus, it is possible to perform control of the arm 20 that matches the shape of the object O with even pressure in the contact area of the palm 40.

Also, according to this example embodiment, the hand control portion 300 that sets the control target for the fingers 50 sets the control target for the fingers 50 such that the pressing force at a point in the contact area of the fingers 50 matches the preset target value, e.g., such that the pressing force at the point in the contact area of the fingers 50 is constant, based on the pressing force at the point in the contact area of the fingers 50 that is detected by the tactile sensor 53. Therefore, it is possible to flexibly adjust to objects O of various shapes and keep the pressing force in the contact area of the fingers 50 constant.

Furthermore, according to this example embodiment, the arm control portion 200 sets the posture of the arm 20 and the force applied to the object as the control target for the arm 20. Therefore, the control of the posture of the arm 20 and the force applied to the object is performed by feeding back the various information of the hand 30. Accordingly, an operation according to multipoint contact of the hand 30 such as tracking the surface of an object becomes possible and it becomes easier to control the pressing force according to multipoint contact of the hand 30.

Incidentally, in this specification, the phrase "at least the position or the posture" refers to the following. That is, when there are three degrees of freedom with the position and three degrees of freedom with the posture such that there are a total of six degrees of freedom, for example, "at least the position or the posture" includes all possible combinations of these six degrees of freedom. For example, for the position (X, Y, Z) and the posture (φ, θ, Ψ), "at least the position or the posture" includes not only a case in which there are two degrees of freedom of only position X and posture θ, but also a case in which there are two degrees of freedom of only positions θ and φ, and a case in which there are four degrees of freedom of positions X and Y and positions θ and Ψ, as well as all of the other possible combinations.

In this example embodiment, the arm control target setting portion preferably sets the control target for the arm such that the distribution of the contact pressure in at least one of the contact area of the base portion, the contact area of the link portion, and the entire contact area of both the base portion and the link portion, approaches the target distribution.

According to this structure, control of the arm that better matches the shape of the object in at least one of the contact area of the base portion, the contact area of the link portion, or the entire contact area of both the base portion and the link portion is possible.

In this example embodiment, the arm control target setting portion preferably sets the control target for the arm such that the pressure center of gravity of the contact pressure in at least one of the contact area of the base portion, the contact area of the link portion, or the entire contact area of both the base portion and the link portion approaches the geometric center of gravity in at least one of the contact area of the base portion, the contact area of the link portion, or the entire contact area of both the base portion and the link portion.

This structure makes it is possible to realize pressure in which the pressure center of gravity of the contact pressure in the contact area of the base portion matches the geometric center of gravity in the contact area of the base portion, such that control of the arm that better matches the shape of the object in the contact area of the base portion can be performed.

Also, it is preferable to provide a link control target setting portion that sets a control target for the link portion. This link control target setting portion preferably sets a control target for the link portion to control at least one of the position and the posture of the link portion with respect to the base portion such that the pressing force at a point in the contact area of the link portion matches a target value, based on the pressing force at the point in the contact area of the link portion that is detected by the link pressing force detecting portion.

According to this structure, it is possible to flexibly adjust to objects O of various shapes and keep the pressing force in the contact area of the fingers 50 constant.

Moreover, the arm control target setting portion preferably sets at least the posture of the arm and the force applied to the object as the control target for the arm.

According to this structure, the control of the posture of the arm and the force applied to the object is performed by feeding back the various information of the hand. Accordingly, an operation with multipoint contact of the hand, such as a task that involves tracking the surface of an object, becomes possible and it becomes easier to control the pressing force according to multipoint contact of the hand.

Next, test examples of this example embodiment will be described. A wiping task using the manipulator 10 of the example embodiment described above was performed and evaluated. Objects O, O', and O'' having curved surfaces of varying curvatures and indentations and protrusions on them, such as those shown in FIG. 15A to 15C were used as the objects in the test example. The portions of the object used in the test were cylindrical portions with diameters of 100 mm and 200 mm, and tests were performed by both sliding the hand sideways and forward (i.e., in the direction toward the fingers). In addition, a wiping task was performed on the indentations and protrusions as well.

Figure 16:
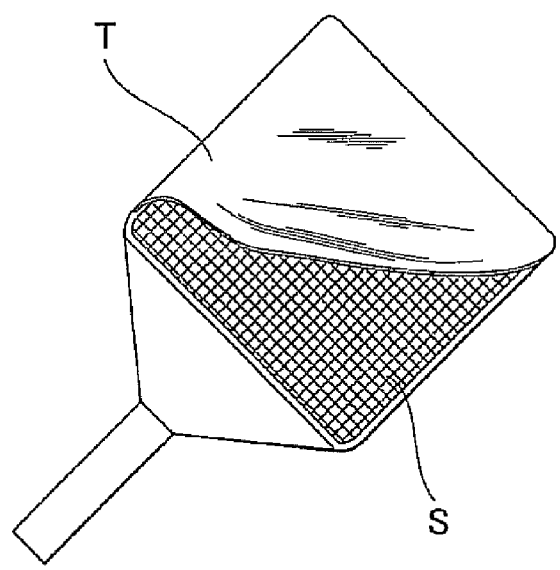
FIG. 16 is a view of a wiping towel used in a test example.
Figure 17A:
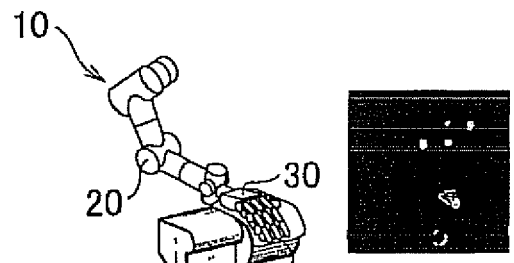
FIGS. 17A to 17F are views of the movement of the manipulator and the pressure distribution in the contact area in test example 1.
Figure 17B:
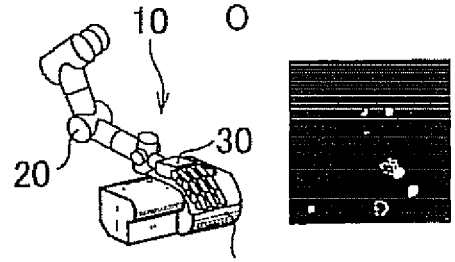
Figure 17C:
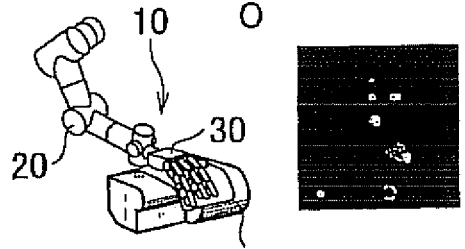
Figure 17D:
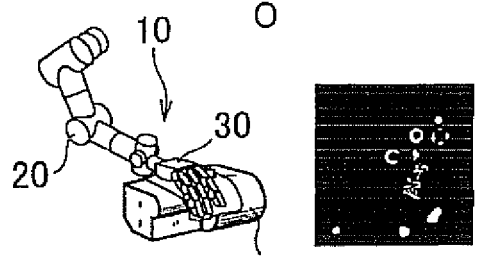
Figure 17E:
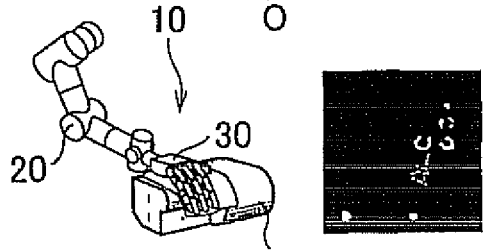
Figure 17F:
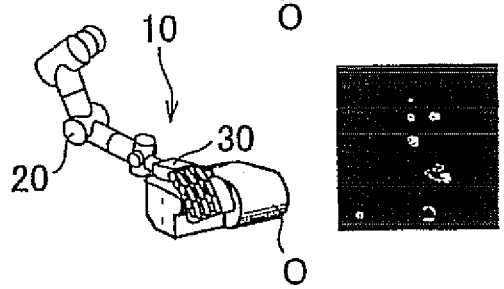
Figure 18:
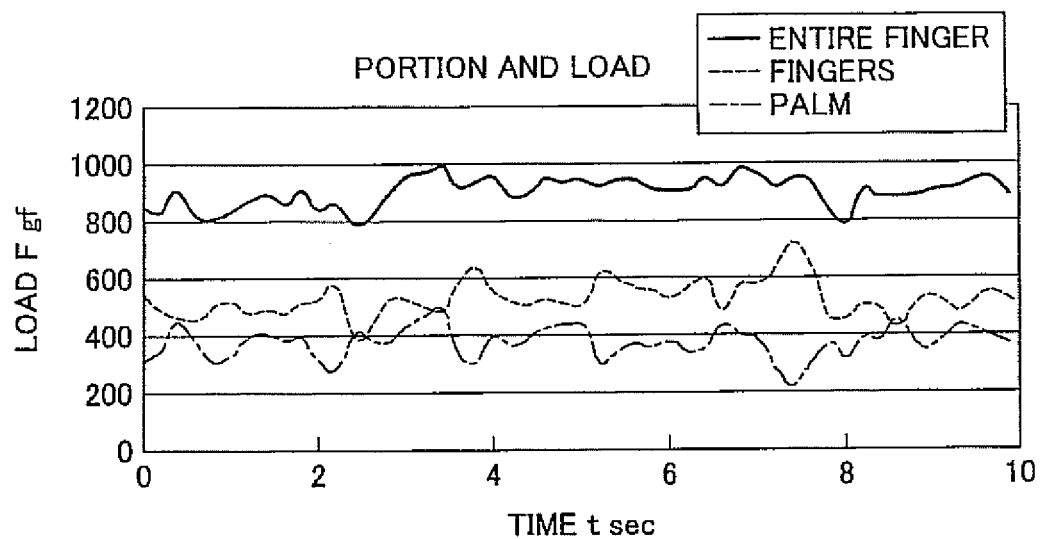
FIG. 18 is a graph showing the load with respect to time for each part of test example 1.
Figure 19:
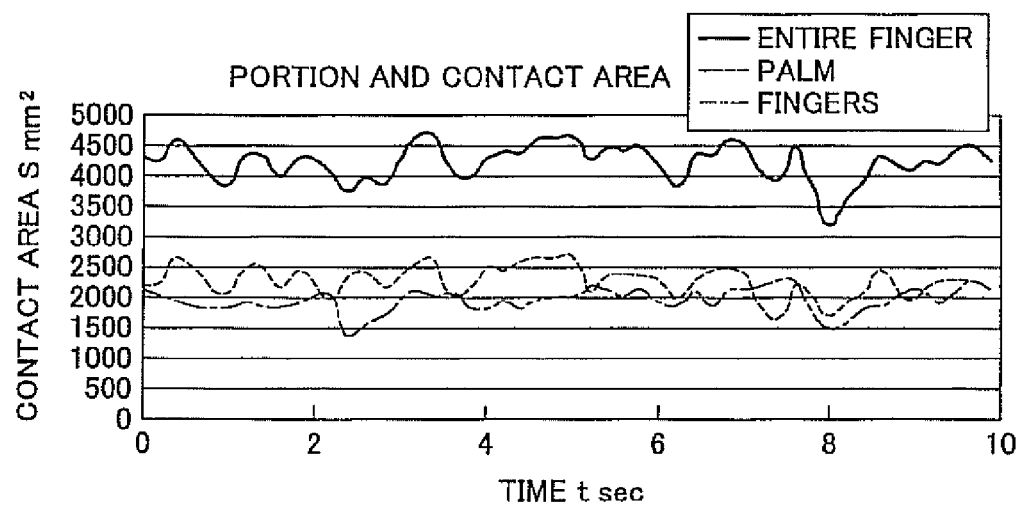
FIG. 19 is a graph showing the contact area with respect to time for each part of test example 1.
Figure 21:
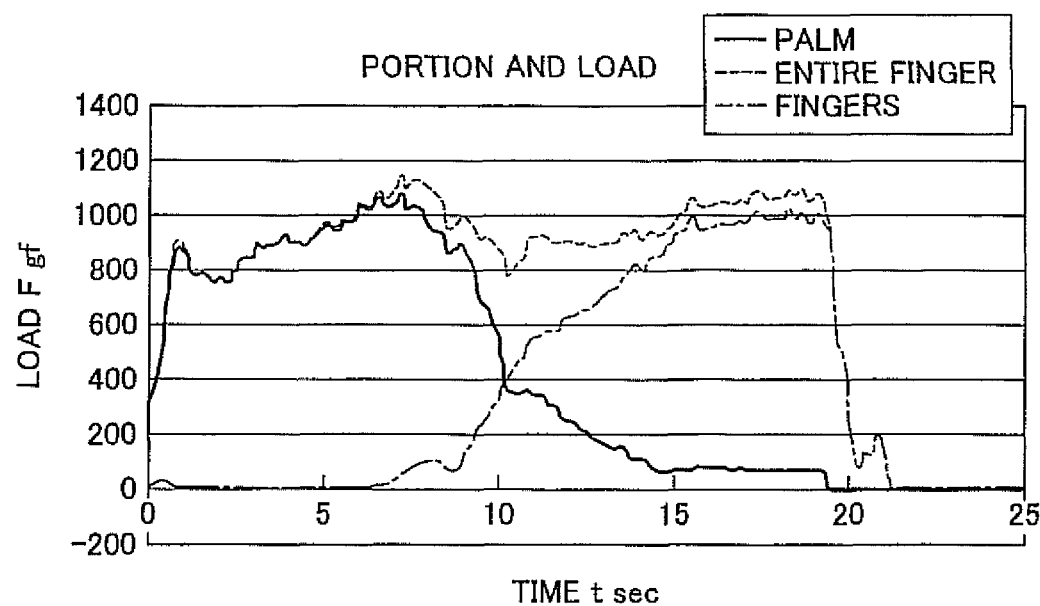
FIG. 21 is a graph showing the load with respect to time for each part of test example 1.
Figure 22:
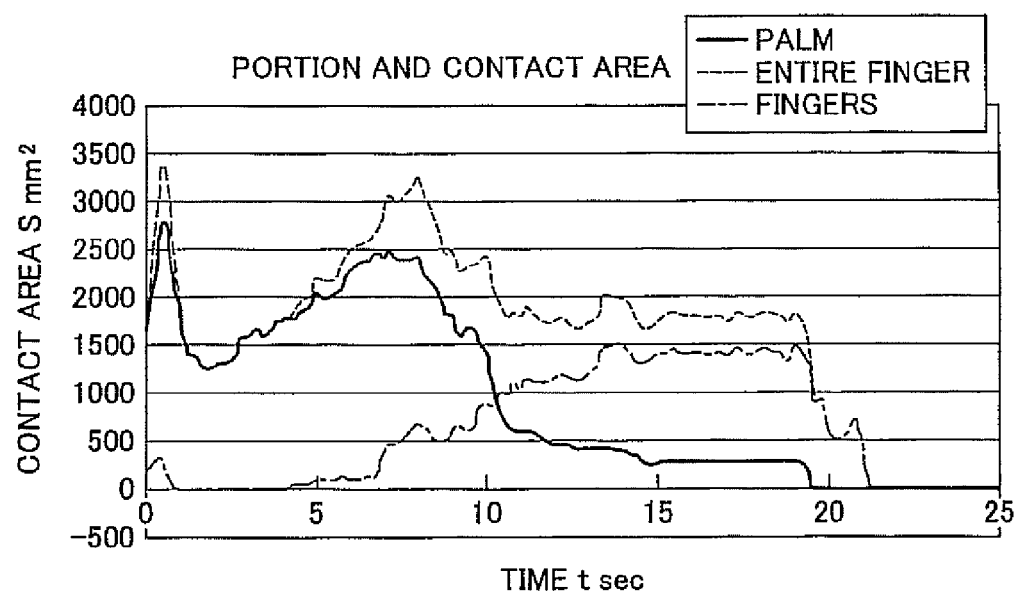
FIG. 22 is a graph showing the contact area with respect to time for each part in test example 1.
Figure 24:
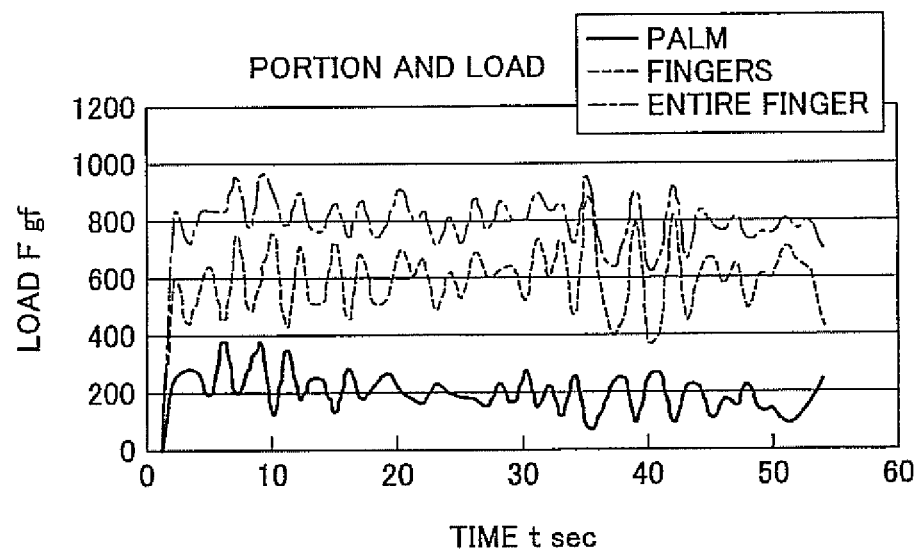
FIG. 24 is a graph showing the load with respect to time for each part of test example 2.
Figure 26A:
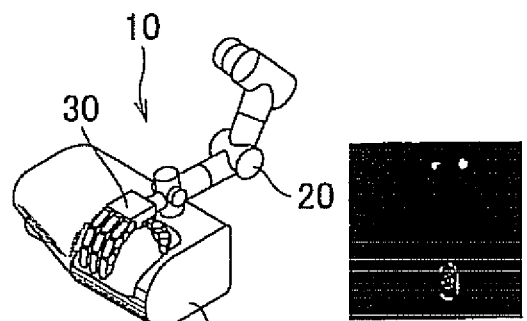
FIGS. 26A to 26D are views of the movement of the manipulator tracking the surface of the object while moving in the direction toward the fingertips, and the pressure distribution in the contact area in test example 3.
Figure 26B:
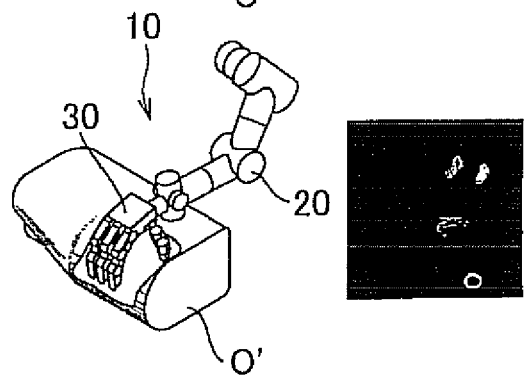
Figure 26C:
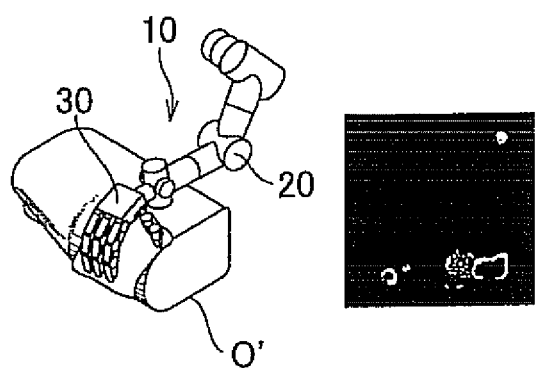
Figure 26D:
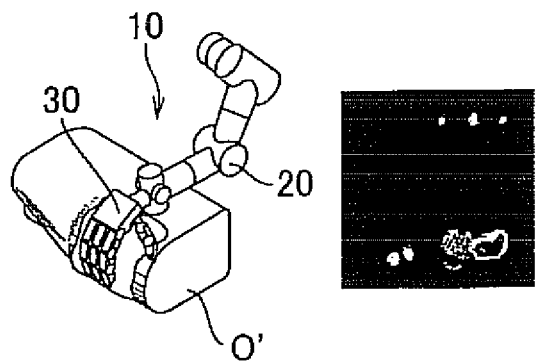
Figure 29:
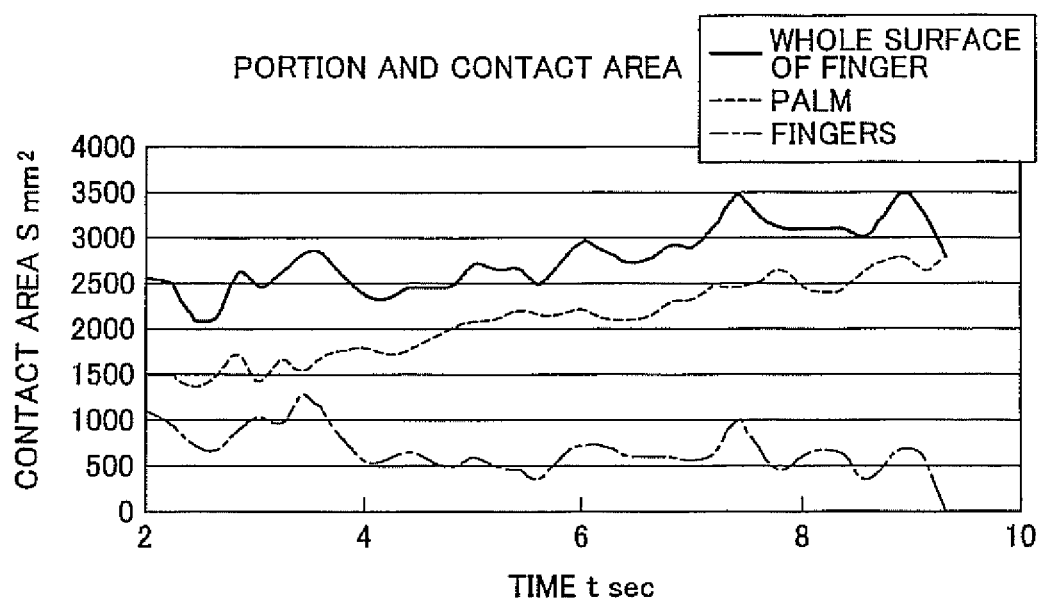
FIG. 29 is a graph showing the contact area with respect to time for each part in test example 3.
Figure 31:
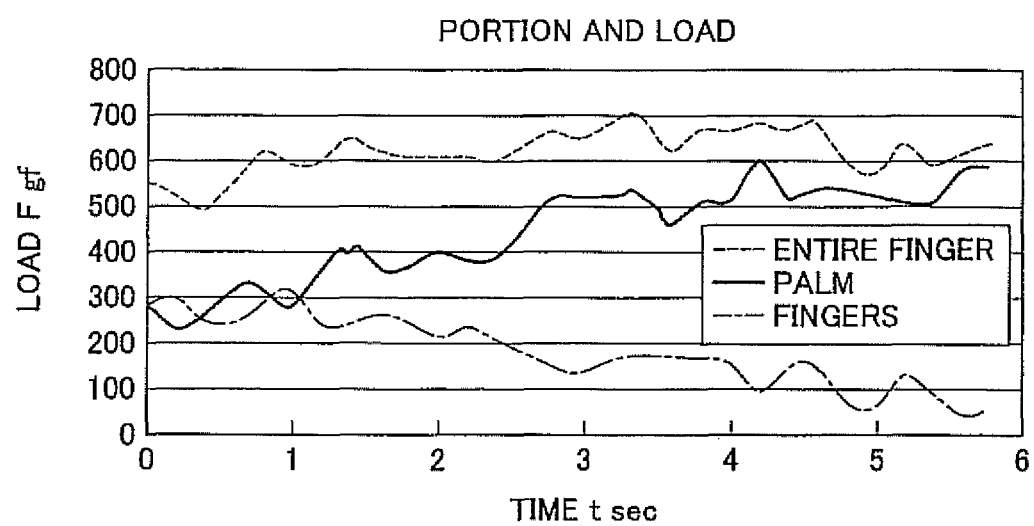
FIG. 31 is a graph showing the load with respect to time for each part in test example 4.

Two control methods of the manipulator 10 were compared, one of which was control using the method of the invention, and the other of which was control that simulates the method according to related art, which treats the hand 30 as a flat surface and uses only the control of the position and the pressing direction of the hand. A distribution type pressure sensor S arranged between towel T that had been folded over was used as the test device, as shown in FIG. 16, and the pressure distribution applied to the objects O, O', and O'' during the wiping task was measured. The contact area and pressure difference were then evaluated from the viewpoints of safety and effectiveness.

Figure 15A:
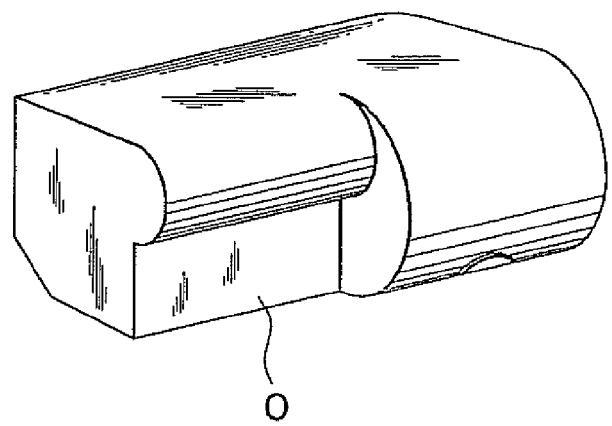
FIG. 15A is a perspective view of an object having a step, which is used in a test example.
Figure 15B:
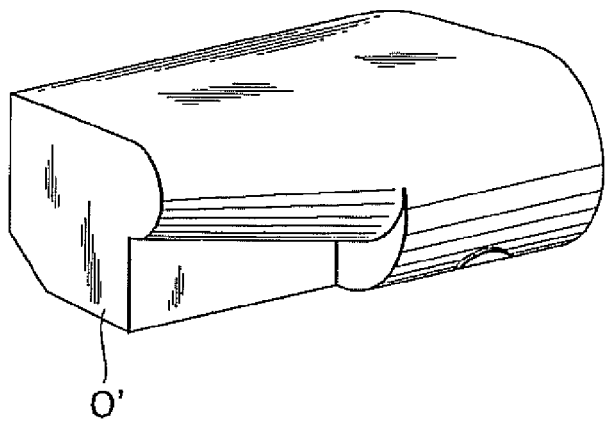
FIG. 15B is a perspective view of an object having a slope, which is used in a test example.

Incidentally, the specifications of the pressure distribution sensor are as follows.
Manufacturer: NITTA
Model No. (Name): 1-Scan150-0.5
Column spacing: 3.75 mm
No. of sensels: 1,936
Size of pressure-sensitive region: 165 mm×165 mm
Thickness: 0.1 mm
Pressure-sensitive range: 0.05 to 0.5 kgf/cm$^2$
Pressure resolution: 8 bit
Sampling cycle: 10 ms Wiping was performed in the sideways direction and the forward direction (that is, in the direction toward the fingers, i.e., the direction in which the fingers extend) on three objects, each of which has a difference shape, i.e., i) an object O that has two different curvatures ($\phi$100 mm and $\phi$200 mm) and a step at the portion where the curvatures differ, as shown in FIG. 15A, ii) an object O' in which the portion where the curvatures differ is gently sloped, as shown in FIG. 15B, and iii) an object O'' that has a protrusion P that has a height of 30 mm and a radius of 60 mm formed on the $\phi$200 mm curved surface.

Test Example 1

Wiping in the sideways direction of the hand 30 was performed by the manipulator 10 that was controlled by the method of the invention on the object O with the abrupt step in between the two curvatures of $\phi$100 mm and $\phi$200 mm. FIGS. 17A to 17F, 18, and 19 show the results. From FIGS. 17 to 19, it is evident that the operation was performed with the fingers independently following the step, the load remained substantially constant over the entire portion, the contact area remained substantially constant over the entire portion, and the load center was kept substantially at the center of the fingers.

Comparative Example 1

Wiping in the sideways direction of the hand 30 was performed by the manipulator 10 with the hand posture control turned off on the object O with the abrupt step in between the two curvatures of $\phi$100 mm and $\phi$200 mm. FIGS. 20A to 20D, 21, and 22 show the results. From FIGS. 20 to 22, it is evident that during the operation, the palm 40 was unable to maintain contact because the arm position correction control was off, and the load was substantially constant with the fingers overall, but changed drastically between the palm 40 and the fingers 50, and there was a large change in the contact area over the entire portion. Thus, stable contact was unable to be maintained, and the load center greatly deviated from the hand geometric center $G_{CG}$.

Test Example 2

Wiping in the sideways direction of the hand 30 was performed by the manipulator 10 that was controlled by the method of the invention on the object O' in which the two curvatures of $\phi$100 mm and $\phi$200 mm are gently sloped. FIGS. 23A to 23D, 24, and 25 show the results. From FIGS. 23 to 25, it is evident that during the operation, tracking was stable even when moving from the slight curvature to the flat surface and the load was substantially constant over the entire portion. In addition, the contact area was remained substantially constant over the entire portion, and the load center remained in substantially the center of the fingers.

Test Example 3

Wiping in the forward direction (i.e., in the direction of the fingers) of the hand 30 was performed by the manipulator 10 that was controlled by the method of the invention at a location with a curvature of $\phi$200 mm on the object O' in which the two curvatures of $\phi$100 mm and $\phi$200 mm are gently sloped. Wiping in the reverse direction (i.e., in the direction away from the fingers and toward the wrist) FIGS. 26A to 26D, 27A to 27D, 28, and 29 show the results. From FIGS. 26 to 29, it is evident that there was some oscillation when the angle of the hand was changed from approximately 0 to 80 degrees and approached 80 degrees during the operation, but tracking was substantially stable. Also, there was a tendency for the load of the palm 40 to gradually increase as the hand angle increased, and the load of the fingers 50 was lower than it was when other operations were performed. The contact area of the palm 40 tended to gradually increase as the hand angle increased, while the contact area of the fingers 50 was less than it was when other operations were performed. The load center tended to be slightly off toward the palm 40, but the amount of change was small.

Test Example 4

Figure 15C:
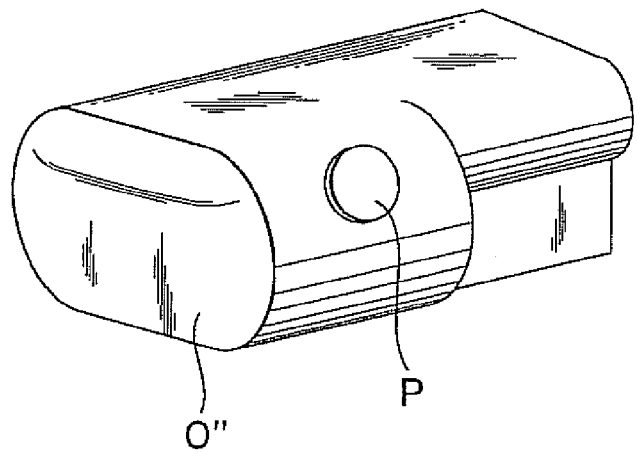
FIG. 15C is a perspective view of an object having a protrusion, which is used in a test example.

Wiping in the forward direction of the hand 30 was performed by the manipulator 10 that was controlled by the method of the invention on the object O″ that has a protrusion F that has a height of 30 mm and a radius of 60 mm formed on the φ200 mm curved surface shown in FIG. 15C. FIGS. 30A to 30E, 31, and 32 show the results. From FIGS. 30 to 32, it is evident that the index finger and the middle finger contacted the protrusion, but each finger operated independently and tracked the object O″. The load of the palm 40 tended to gradually increase as the hand angle increased, and conversely, the load of the fingers 50 tended to decreases as the hand angle increased. At the protrusion P, the fingers oscillated so the contact area was unsteady (i.e., increased and decreased). When the fingers 50 moved over the protrusion P, the load center shifted temporarily toward the fingers 50 but then returned to the center.

The results of the test examples described above will now be summarized. With regard to safety, the contact area is constantly large from beginning to end of the task because the entire hand 30 constantly conforms to the curved surface. Also, the pressure was dispersed so local pressure differences were prevented by the fingers 50 conforming to the indentations and protrusions. Also, with regard to effectiveness, the control method of the example embodiment was effective in that it resulted in a larger contact area and less pressure difference, so the wiped area increased, leaving fewer places unwiped. In particular, the integral value of the contact area on the curved surface with the control according to the control method of the example embodiment was approximately twice that without the control according to the control method of the example embodiment, which shows that the effect of the control method of this example embodiment is significant.

While the invention has been described with reference to example embodiments thereof, it is to be understood that the invention is not limited to the described embodiments or constructions. On the other hand, the invention is intended to cover various modifications and equivalent arrangements. In addition, while the various elements of the disclosed invention are shown in various example combinations and configurations, other combinations and configurations, including more, less or only a single element, are also within the scope of the appended claims.

What is claimed is:

1. A robotic device comprising:
   a first link portion;
   a second link portion that moves relative to the first link portion;
   a joint between the first link portion and the second link portion, the joint having a movement detecting portion that detects an angle and a position of the second link portion with respect to the first link portion;
   a first contact load detecting portion that detects a contact load in a contact area of the first link portion;
   a second contact load detecting portion that detects a contact load in a contact area of the second link portion; and
   a first link portion control target setting portion that sets a control target for the first link portion, wherein the first link portion control target setting portion sets the control target for the first link portion based on a first detection value of the contact load of the first contact load detecting portion, a second detection value of the contact load of the second contact load detecting portion, and at least one of the angle or the position of the second link portion with respect to the first link portion detected by the movement detecting portion such that a difference between the first detection value of the contact load of the first contact load detecting portion and the second detection value of the contact load of the second contact load detecting portion decreases, the first detection value is constant throughout the contact area of the first link portion, and the second detection value of the contact area of the second link portion is non zero.

2. A robotic device comprising:
   a base portion;
   a first link portion that moves relative to the base;
   a second link portion that moves relative to the first link portion;
   a first joint between the base portion and the first link portion, the first joint having a first movement detecting portion that detects an angle and a position of the first link portion with respect to the base portion;
   a second joint between the first link portion and the second link portion, the second joint having a second movement detecting portion that detects an angle and a position of the second link portion with respect to the first link portion;
   a first contact load detecting portion that detects a contact load in a contact area of the first link portion;
   a second contact load detecting portion that detects a contact load in a contact area of the second link portion; and
   a first link portion control target setting portion that sets a control target for the first link portion,
   wherein the first link portion control target setting portion sets the control target for the first link portion based on a first detection value of the contact load of the first contact load detecting portion, a second detection value of the contact load of the second contact load detecting portion, at least one of the angle or position of the first link portion with respect to the base portion detected by the first movement detecting portion, and at least one of the angle or position of the second link portion with respect to the first link portion detected by the second movement detecting portion such that a difference between the first detection value of the contact load of the first contact load detecting portion and the second detection value of the contact load of the second contact load detecting portion decreases, the first detection value is constant throughout the contact area of the first link portion, and the second detection value of the contact area of the second link portion is non zero.

3. A robotic device comprising:
   an arm;
   a hand at an end of the arm;
   a wrist joint between the hand and the end of the arm, the wrist joint having a wrist movement detecting portion that detects an angle and a position of the hand with respect to the arm; and
   an arm control target setting portion that sets a control target for the arm,
   wherein the hand includes a base portion that is attached to the wrist joint, at least one link portion capable of moving with respect to the base portion, a base pressing force detecting portion that detects a pressing force at two or more points in a contact area of the base portion against a surface of an object, a link pressing force detecting portion that detects a pressing force at a point in a contact area of the link portion against the surface of the object, and a link joint between the base and the link portion having a link movement detecting portion that detects an angle and a position of the link portion with respect to the base portion; and wherein the arm control target setting portion sets the control target for the arm based on the pressing force at the point in the contact area of the base portion detected by the base pressing force detecting portion, the pressing force at the point in the contact area of the link portion detected by the link pressing force detecting portion, at least one of the angle or the position of the hand with respect to the arm detected by the wrist movement detecting portion, and at least one of the angle or position of the link portion with respect to the base portion detected by the link movement detecting portion such that a difference between the pressing force detected by the base pressing force detecting portion and the pressing force detected by the link pressing force detecting portion decreases, the pressing force detected by the base pressing force detecting portion is constant throughout the contact area of the base portion, and the contact area of the link portion maintains physical contact with the surface of the object.

4. The robotic device according to claim 3, wherein the arm control target setting portion sets the control target for the arm such that a distribution of contact pressure in at least one of the contact area of the base portion, the contact area of the link portion, or a total contact area of the base portion and the link portion combined approaches a target distribution.

5. The robotic device according to claim 4, wherein the arm control target setting portion sets the control target for the arm such that a pressure center of gravity of a contact pressure in at least one of the contact area of the base portion, the contact area of the link portion, or the total contact area of the base portion and the link portion combined approaches a geometric center of gravity in at least one of the contact area of the base portion, the contact area of the link portion, or the total contact area of the base portion and the link portion combined, respectively.

6. The robotic device according to claim 5, wherein the arm control target setting portion sets the control target for the arm such that the pressure center of gravity of the contact pressure of the base portion approaches the geometric center of gravity of the base portion by applying a strongest pressure to the geometric center of gravity of the base portion.

7. The robotic device according to claim 5, wherein the arm control target setting portion sets the control target for the arm such that a moment obtained from a pressure at the base portion and a distance between a position where the pressure is applied and the geometric center of gravity of the base portion becomes substantially zero.

8. The robotic device according to claim 3, further comprising:
a link control target setting portion that sets a control target for the link portion,
wherein the link control target setting portion sets the control target for the link portion to control at least one of the angle or position of the link portion with respect to the base portion, based on the pressing force of a point in the contact area of the link portion detected by the link pressing force detecting portion, such that the pressing force at the point in the contact area of the link portion matches a target value.

9. The robotic device according to claim 3, further comprising:
a link control target setting portion that sets a control target for the link portion,
wherein the link portion has a plurality of the link pressing force detecting portions, and the link control target setting portion controls a bending and an extending of the link portion based on a difference between the pressing forces detected by the plurality of link pressing force detecting portions.

10. The robotic device according to claim 3, wherein the arm control target setting portion sets at least one of the angle of the arm or force to be applied to the object as the control target for the arm.

11. The robotic device according to claim 3, wherein a flexible covering is provided on the base portion, the wrist joint, and the link portion is formed of a passive flexible joint.

12. The robotic device according to claim 3, wherein the link portion has a plurality of link pressing force detecting portions, and the arm control target setting portion controls a bending and an extending of the link portion based on a difference between the pressing forces detected by the plurality of link pressing force detecting portions.

13. A control method of a robotic device provided with a first link portion, a second link portion that moves relative to the first link portion, and a joint between the first link portion and the second link portion, the joint having a movement detecting portion that detects an angle and a position of the second link portion with respect to the first link portion, comprising:
detecting the angle and the position of the second link portion with respect to the first link portion;
detecting a contact load in a contact area of the first link portion;
detecting a contact load in a contact area of the second link portion; and
setting a control target for the first link portion based on a first detection value of the contact load in the contact area of the first link portion, a second detection value of the contact load in the contact area of the second link portion, and at least one of the angle or position of the second link portion with respect to the first link portion such that a difference between the first detection value of the contact load in the contact area of the first link portion and the second detection value of the contact load in the contact area of the second link portion decreases, the first detection value is constant throughout the contact area of the first link portion, and the second detection value of the contact area of the second link portion is non zero.

14. A control method of a robotic device provided with a base portion, a first link portion that moves relative to the base portion, a second link portion that moves relative to the first link portion, a first joint between the base portion and the first link portion, the first joint having a first movement detecting portion that detects an angle and a position of the first link portion with respect to the base portion, and a second joint between the first link portion and the second link portion, the second joint having a second movement detecting portion that detects an angle and a position of the second link portion with respect to the first link portion, comprising:
detecting at least one of the angle or the position of the first link portion with respect to the base portion;
detecting at least one of the angle or the position of the second link portion with respect to the first link portion;
detecting a contact load in a contact area of the first link portion;
detecting a contact load in a contact area of the second link portion; and
setting a control target for the first link portion based on a first detection value of the contact load in the contact area of the first link portion, a second detection value of the contact load in the contact area of the second link portion, at least one of the angle or the position of the first link portion with respect to the base portion, and at least one of the angle or the position of the second link portion with respect to the first link portion such that a difference between the first detection value of the contact load in the contact area of the first link portion and the second detection value of the contact load in the contact area of the second link portion decreases, the first detection value is constant throughout the contact area of the first link portion, and the detection contact value of the contact area of the second link portion is non zero.

15. A control method of a robotic device provided with an arm, a hand which is provided at an end of the arm and has a base portion that is attached to the end of the arm, a wrist joint between the hand and the end of the arm, the wrist joint having a wrist movement detecting portion that detects an angle and a position of the hand with respect to the arm, at least one link portion that is capable of moving with respect to the base portion, and a link joint between the base and the link portion having a link movement detecting portion that detects an angle and a position of the link portion with respect to the base portion, comprising:

detecting a pressing force at two or more points in a contact area of the base portion against a surface of an object;

detecting a pressing force at a point in a contact area of the link portion against the surface of the object;

detecting at least one of the angle or the position of the hand with respect to the arm;

detecting at least one of the angle or the position of the link portion with respect to the base portion; and setting a control target for the arm based on the detected pressing force at the point in the contact area of the base portion, the detected pressing force at the point in the contact area of the link portion, at least one of the angle or position the hand with respect to the arm, and at least one of the detected angle or position of the link portion with respect to the base portion such that a difference between the pressing force in the contact area of the base portion and the pressing force in the contact area of the link portion decreases, the pressing force in the contact area of the base portion is constant throughout the contact area of the base portion, and the contact area of the link portion maintains physical contact with the surface of the object.

\* \* \* \* \*

UNITED STATES PATENT AND TRADEMARK OFFICE
CERTIFICATE OF CORRECTION

PATENT NO. : 8,442,678 B2  
APPLICATION NO. : 12/631100  
DATED : May 14, 2013  
INVENTOR(S) : Kentaro Ichikawa et al.

Page 1 of 1

It is certified that error appears in the above-identified patent and that said Letters Patent is hereby corrected as shown below:

In the claims:

At column 24, claim number 15, line number 13, after position, Insert --of--.

Signed and Sealed this
Twenty-sixth Day of August, 2014

Michelle K. Lee
*Deputy Director of the United States Patent and Trademark Office*